(12) United States Patent
Singhai et al.

(10) Patent No.: US 11,599,505 B2
(45) Date of Patent: Mar. 7, 2023

(54) REFERENCE SET CONSTRUCTION FOR DATA DEDUPLICATION

(71) Applicant: Western Digital Technologies, Inc., San Jose, CA (US)

(72) Inventors: Ashish Singhai, Los Altos, CA (US); Ashwin Narasimha, Los Altos, CA (US); Vijay Karamcheti, Palo Alto, CA (US); Tanay Goel, Chhattisgarh (IN)

(73) Assignee: Western Digital Technologies, Inc., San Jose, CA (US)

( * ) Notice: Subject to any disclaimer, the term of this patent is extended or adjusted under 35 U.S.C. 154(b) by 1358 days.

(21) Appl. No.: 15/604,567

(22) Filed: May 24, 2017

(65) Prior Publication Data

US 2018/0025046 A1     Jan. 25, 2018

Related U.S. Application Data

(60) Provisional application No. 62/364,310, filed on Jul. 19, 2016.

(51) Int. Cl.
*G06F 16/174* (2019.01)
*G06F 16/23* (2019.01)
(Continued)

(52) U.S. Cl.
CPC ........ *G06F 16/1748* (2019.01); *G06F 3/0608* (2013.01); *G06F 3/0641* (2013.01);
(Continued)

(58) Field of Classification Search
CPC .. G06F 3/0608; G06F 3/0641; G06F 11/1453; G06F 16/1748; G06F 3/0659; G06F 16/288; G06F 16/215; G06F 16/1752; G06F 16/152; G06F 16/24554; G06F 16/2358; G06F 16/21; G06F 16/2477; G06F 16/26; G06F 16/7847; G06F 16/2291
See application file for complete search history.

(56) References Cited

U.S. PATENT DOCUMENTS 8,280,926 B2    10/2012   Sandorfi et al.
8,370,305 B2    2/2013   Petrocelli
(Continued)

OTHER PUBLICATIONS

Uknown Author "Using References with Deduplication" dated 2010, 4 pages, nModal Solutions Inc.
(Continued)

*Primary Examiner* — Tamara T Kyle
*Assistant Examiner* — Berhanu Mitiku
(74) *Attorney, Agent, or Firm* — Loza & Loza, LLP; Gabriel Fitch

(57) ABSTRACT

By way of example, a data storage system may comprise, a non-transitory storage device storing data blocks in chunks, and a storage logic coupled to the non-transitory storage device that manages storage of data on the storage device. The storage logic is executable to receive a data stream for storage in a non-transitory storage device, the data stream including one or more data blocks, analyze the data stream to determine a domain, retrieve a pre-configured reference set based on the domain, and deduplicate the one or more data blocks of the data stream using the pre-configured reference set.

19 Claims, 13 Drawing Sheets

(51) Int. Cl.
  *G06F 16/215* (2019.01)
  *G06F 11/34* (2006.01)
  *G06F 11/30* (2006.01)
  *G06F 3/06* (2006.01)
  *G06F 16/22* (2019.01)
  *G06F 16/17* (2019.01)

(52) U.S. Cl.
  CPC .......... *G06F 3/0652* (2013.01); *G06F 3/0683* (2013.01); *G06F 11/3034* (2013.01); *G06F 11/3409* (2013.01); *G06F 16/1724* (2019.01); *G06F 16/1727* (2019.01); *G06F 16/1752* (2019.01); *G06F 16/215* (2019.01); *G06F 16/2291* (2019.01); *G06F 3/0604* (2013.01)

(56) References Cited

U.S. PATENT DOCUMENTS

| | | | |
|---|---|---|---|
| 8,392,376 B2 | 3/2013 | Guo | |
| 8,495,028 B2 | 7/2013 | Reiter et al. | |
| 8,504,533 B2 | 8/2013 | Dewey et al. | |
| 8,954,398 B1 | 2/2015 | Zhang et al. | |
| 9,021,203 B2 | 4/2015 | Hyde, II et al. | |
| 9,690,501 B1* | 6/2017 | Chopra | G06F 3/065 |
| 2011/0246741 A1* | 10/2011 | Raymond | G06F 16/137 711/170 |
| 2012/0143835 A1* | 6/2012 | Aronovich | G06F 16/907 707/696 |
| 2012/0191670 A1* | 7/2012 | Kennedy | G06F 16/1748 707/E17.005 |
| 2013/0297872 A1* | 11/2013 | Hyde, II | G06F 3/0608 711/E12.016 |
| 2014/0279953 A1 | 9/2014 | Aronovich | |
| 2015/0019816 A1* | 1/2015 | Akirav | G06F 12/0848 711/129 |
| 2017/0255643 A1* | 9/2017 | Maheshwari | G06F 16/182 |
| 2017/0293450 A1* | 10/2017 | Battaje | G06F 3/0679 |
| 2017/0311035 A1* | 10/2017 | Lewis | H04N 21/44204 |

OTHER PUBLICATIONS

Unknown Auther "Data Deduplication Background: A Technical White Paper" dated Jul. 2014, 12 pages, Quantum Deduplication Systems.

Unknown Author "Data Deduplication—The Pseudo Random Bit Bucket" dated Jun. 15, 2013, 11 pages, Blog at NordPress.com.

* cited by examiner

REFERENCE SET CONSTRUCTION FOR DATA DEDUPLICATION

CROSS REFERENCE TO RELATED APPLICATIONS

The present application claims priority, under 35 U.S.C. § 119, to U.S. Provisional Patent Application No. 62/364,310, filed Jul. 19, 2016 and entitled "Reference Set Construction for Data Deduplication," which is incorporated by reference in its entirety.

BACKGROUND

The present disclosure relates to data deduplication.

To improve storage utilization, data deduplication is often used to eliminate repeating data. Some approaches substitute reference pointers for redundant data segments, such as variable-length blocks, in a given data set. This can increase the amount of information that can be stored or transmitted over networks. Other solutions include single-instance storage configured to eliminate the repeat storage of identical files.

Some existing solutions apply similarity-based content matching to identify similarities between a set of documents, as opposed to an exact match. For instance, content matching has been used in search engine implementations and in building dynamic random access memory (DRAM)-based caches such as, hash lookup-based deduplication. The existing solutions for DRAM-based caches utilize exact matching and not similarity-based deduplication (which identifies approximate matches) because of technical hurdles with using similarity-based deduplication in storage devices.

For example, the architecture of flash-based storage devices limits the amount of available data blocks for storing information. As such, substantial overhead in block carry-over exists in flash management, which can influence performance of flash storage devices. As the concentration of a flash storage device increases, the number and size of data blocks is increased, resulting in even more overhead aid lower performance for write and rewrite operations. Memory waste can also occur. The existing solutions are unable to effectively minimize this memory waste, as well as efficiently manage and construct reference sets when deduplicating data in storage devices, such as flash storage devices.

SUMMARY

The present disclosure relates to technology for constructing reference sets.

According to one innovative aspect, the subject matter described in this disclosure may be embodied in a system comprising a non-transitory storage device storing data blocks in chunks and a storage logic coupled to the non-transitory storage device that manages storage of data on the non-transitory storage device. The storage logic is executable to: receive a data stream for storage in the non-transitory storage device, the data stream including one or more data blocks; analyze the data stream to determine a domain; retrieve a pre-configured reference set based on the domain; and deduplicate the one or more data blocks of the data stream using the pre-configured reference set.

In general, another innovative aspect of the subject matter described in this disclosure may be embodied in methods comprising: receiving a data stream for storage in a non-transitory storage device, the data stream including one or more data blocks; analyzing the data stream to determine a domain; retrieving a pre-configured reference set based on the domain; and deduplicating the one or more data blocks of the data stream using the pre-configured reference set.

These and other implementations may each optionally include one or more of the following features: that the storage logic is further executable to evaluate performance of the pre-configured reference set in deduplicating data blocks of one or more prior data streams, assign a performance score to the pre-configured reference set based on the evaluated performance, and generate a ranking for the pre-configured reference set for the domain relative to other reference sets associated with the domain based on the performance score; that retrieving the pre-configured reference set includes retrieving the pre-configured reference set based further on the ranking of the pre-configured reference set; that the performance of the pre-configured reference set is evaluated based on a deduplication ratio; that the performance of the pre-configured reference set is evaluated based on a deduplication speed; that the domain is a range of physical area of the non-transitory storage device that hosts data blocks with similar characteristics; that the storage logic is further executable to generate the pre-configured reference set as a synthetic reference set for data block sequences that repeat at a rate above a predetermined threshold, identify a duplicated data block sequence, retrieve the synthetic reference set based on the duplicated data block sequence, and deduplicate the identified duplicated data block sequence using the synthetic reference set; that the storage logic is further executable to assign a use count variable to the pre-configured reference set, update the use count variable when the pre-configured reference set is used to deduplicate the data blocks, and store the pre-configured reference set including the use count variable in the non-transitory storage device.

Other implementations of one or more of these aspects include corresponding systems, apparatus, computer programs, and other aspects, such as those configured to perform the actions of the methods, encoded on computer storage devices.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
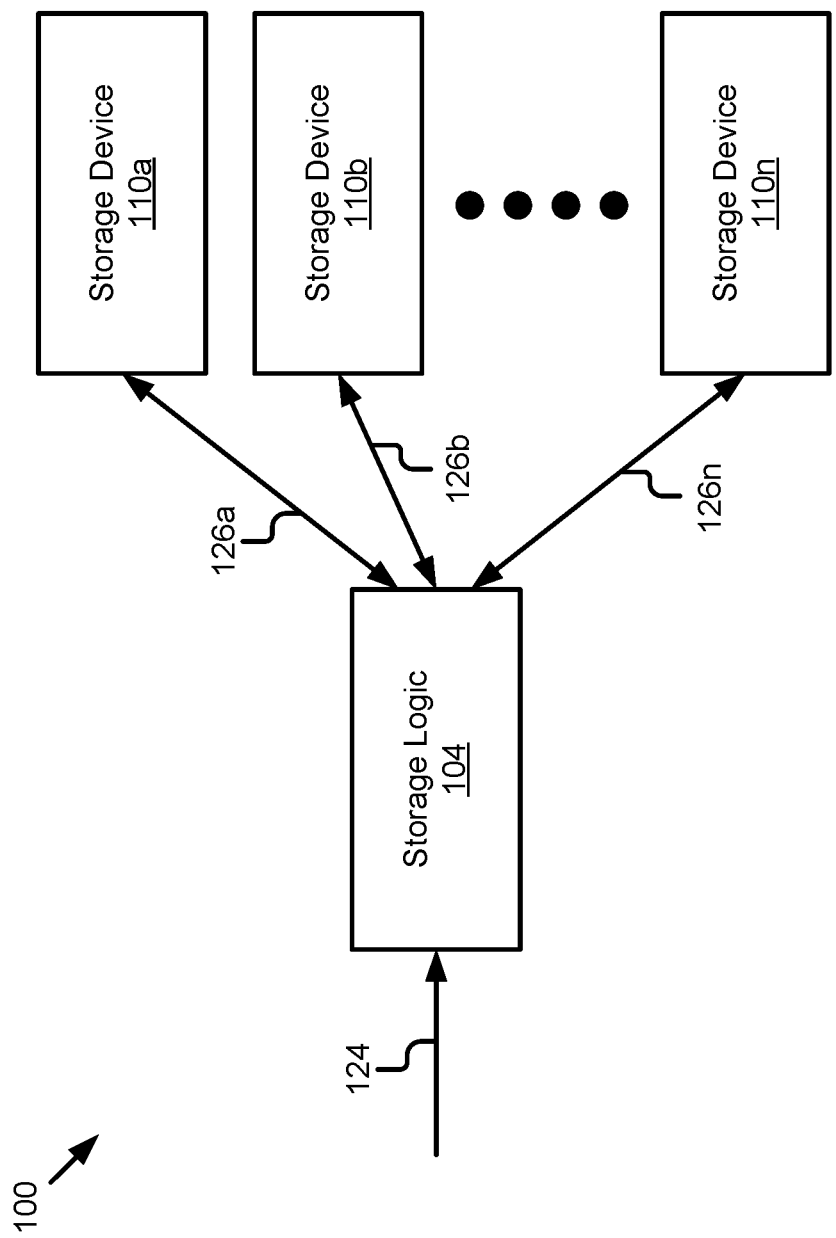
FIG. 1 is a high-level block diagram illustrating an example data duplication flow between storage device system components.

This application describes technology for constructing reference sets in data deduplication. In particular, the technology can manage sets of reference data blocks in storage devices, and in a more specific example embodiment, in flash-storage devices. While the technology is described in the context of particular system architecture that uses flash-storage, it should be understood that the technology can be applied to other architectures and hardware configurations.

Many deduplication processes use a global reference set when deduplicating data. A global reference set manages information spread across the storage device of a storage system, or across the storage system, and may in some cases be agnostic to data block arrival time. For instance, once a data block is encoded using a global reference set, the data block relies on the global reference set for recall. Therefore, the global reference set must remain valid for the entire lifecycle of this data block so it can be reconstructed. This can create a significant overhead because the storage system must maintain both the global reference set and the use count of this reference set over the life cycle of all data referenced by the global reference set. Over time, the global reference set may become largely unused, but must still be maintained (cannot be erased), even when only a small number of data blocks still rely upon the global reference set.

As a result, while using a global reference set can yield advantages, it also carries various disadvantages, such as a higher computing cost, and lower time efficiency and may be preferential under certain conditions.

The technology addresses the limitations of data deduplication using global reference sets via innovative alternatives for referencing data during data duplication. The following sections A-D set forth example embodiments of these alternatives, although it should be understood that these embodiments are not intended to be limiting, but rather, illustrative of the technology's capabilities and advantages.

A. Local Reference Set of a Chunk for Deduplication in Memory Management

One technique for reference data during data duplication is to construct a local reference set for each chunk of data. A chunk of data (or simply, a chunk) is a contiguous range of physical blocks in a storage device of the storage system. The storage system fills the chunk sequentially and erases it as a unit. This way, even if some data blocks within the chunk are invalid (e.g., logical addresses are erased), their contents are still available to other data blocks within that chunk (e.g., the data is not yet erased from the physical address).

A local reference set, for a given chunk, references data within that chunk that shares a degree of similarity. For example, a local reference set may include local reference blocks of the same or similar type that are available in the same chunk.

A local reference set may have the following characteristics: 1) constructed using only the data blocks in the chunk associated with the local reference set; 2) used to run a deduplication algorithm actively for any data stream that intends to store data in this chunk; 3) packaged along with the data blocks of the chunk that rely on the local reference set (and therefore stays persistent (does not disappear) during use); and 4) eliminates the maintenance of a use count because it does not need to be retired when it is no longer in use.

The storage system manages the local reference set along with the chunk with which the local reference set is associated. This allows the block(s) of the chunk storing the local reference set to be available to other data blocks within the chunk. This eliminates the need for maintaining a use count for the local reference set, and reduces the implementation overhead of referencing the data (e.g., down as low as to nearly zero). Further, as a data stream being received and processed by the storage system changes, and data is stored in other chunks, the storage system creates and/or updates other local reference sets for those chunks. Using the local reference set as described can also provide the advantage of capturing the temporal locality of a data stream, since the storage management systems, such as flash management systems, tend to collocate data blocks arriving in the same time interval.

In some implementations, a storage system may select between, or utilize both, global and local reference sets depending upon the operational objectives (e.g., time efficiency, deduplication ratio, and overall computing cost, etc.) of storing data streams.

B. Namespace Reference Set Construction and Use in Memory Management

A namespace may comprise containers of data within a storage system. Each namespace may host data blocks of similar characteristics. For example, email, internet surfing history, payroll data, sales record may all consume different namespaces for the data blocks within each of them share similar characteristics. In some implementations, the data blocks coming from one particular application of the operation system may reside within the same namespace. In a data deduplicating process, the storage system may implement a namespace reference set. Namespace reference set construction and usage can be implemented by performing namespace analysis on the incoming data stream and use of the namespace reference set.

Because a namespace contains data blocks with the similar characteristics, constructing and using the same namespace reference set for the same type of data blocks can provide advantages. For instance, using a namespace reference set in data deduplicating the same types of data blocks may yield a higher deduplication ratio and time efficiency in the memory management. Further, the namespace may be adapted based on an imprecise namespace analysis performed on incoming data stream.

The namespace reference set may also be used to identify a rough scope of reference set to deduplicate data blocks. Assuming that there are ten (10) namespaces built in the storage system, the incoming data stream can be analyzed and determined that it fits in one of these ten (10) namespace.

In some implementations, for each of the namespaces, a local reference set or a global reference may alternatively be utilized. The storage system may evaluate these two reference sets relative to the above ten namespace reference sets, and select the namespace that would yield the best overall efficiencies in deduplicating the incoming data stream. This will reduce the overall computing cost for evaluating the most suitable reference set comparing to evaluating the ten namespace reference sets.

C. Domain Reference Sets Construction and Use in Memory Management

A domain reference set is a pre-configured reference set that may be utilized in a data deduplicating process. In a scale-out system where one application is deployed across many devices, each of which have flash drives, using a domain reference set in deduplicating data blocks may yield advantages over other solutions. For example, while a current reference data set is being used to deduplicate an incoming data stream (e.g. series of data blocks), a new reference data set can be constructed in parallel. The new reference data may be started afresh or can be constructed using a pre-configured or existing reference set. For example, when the incoming data stream is being analyzed and determined to belong to one of the various domains, a pre-configured reference set that is suitable for deduplication of this domain may be used to deduplicate the incoming data stream. This can eliminate the computing cost for constructing a reference set afresh.

In some cases, a particular pre-configured reference sets for the repeating data blocks may be used. Some types of data may include the same or similar header information. For instance, the header of a particular type of data may contain repeating data, such as the "from," "to," "CC" in an email header. Aggregating the repeating data sets into a reference set so as to deduplicate data blocks can provide performance advantages over other solutions. In such cases, a synthetic reference set for these repeating data blocks may be used. In some instances, synthetic reference sets may be pre-configured based on the domain with which they are associated.

D. Huffman Table for Data Blocks Based on Reference Sets in Flash Storage Systems A Huffman table may be used to compress data in the storage management field. However, if the system uses an existing Huffman table to compress data blocks, this might lead to a non-optimal compression ratio due to that the data pattern may vary. On the other hand, if the system calculates a Huffman table afresh, this might take a lot of computing resources.

In some embodiments, the storage system may construct or select a reference set that is similar to the data stream and then deduplicate the data blocks in the data stream using the constructed/selected reference set. Because of the similarity between the constructed/selected reference set and the data stream, it is desirable to use the existing Huffman table of the reference set to compress the incoming data stream. It should be recognized that this Huffman table provides better results than the static Huffman table and consumes less computing resource than a freshly-computed Huffman table. Thus, the present disclosure provides a Huffman table between the reference data set and the incoming data.

System

FIG. 1 is a high-level block diagram illustrating an example system 100 for reference sets construction for data deduplication in a storage device according to the techniques described herein. In the depicted implementation, the system 100 may include storage logic 104 and one or more storage devices 110*a*, 110*b* through 110*n*. In some implementations, the storage logic 104 and the one or more storage devices 110*a*, 110*b* through 110*n* may be communicatively coupled via a switch (not shown). However, the present disclosure is not limited to this configuration and a variety of different system environments and configurations can be employed and are within the scope of the present disclosure. Other implementations may include additional or fewer components. It should be recognized that an indication of a letter after a reference number or numeral, for example, "110*a*" is a specific reference to the element or component that is designated by that particular reference numeral. In the event a reference numeral appears in the text without a letter following it, for example, "110," it should be recognized that such is a general reference to implementations of the element or component bearing that general reference numeral.

In some implementations, the storage logic 104 provides reference sets construction functionalities in storage devices 110. The storage logic 104 may provide computing functionalities, services, and/or resources to send, receive, read, write, and transform data from other entities of system 100. In some implementations, the storage logic 104 can be a computing device configured to make a portion or all of the storage space available on storage devices 110. The storage logic 104 is coupled to the storage devices 110 via signal lines 126 for communication and cooperation with the storage devices 110*a*-110*n* of the system 110. In other implementations, the storage logic 104 transmits data between the storage devices 110*a*-110*n* via the signal lines 126*a*-126*n*. It should be recognized that multiple storage logic units 104 can be utilized, either in a distributed architecture or otherwise. For the purpose of this application, the system configuration and operations performed by the system are described in the context of a single storage logic 104.

A switch (not shown) can be a conventional type and may have numerous different configurations. Furthermore, the switch may include an Ethernet, InfiniB and, PCI-Express switch, and/or other interconnected data paths switches, across which multiple devices (e.g., storage devices 110) may communicate.

The storage devices 110*a*, 110*b* through 110*n*, may include a non-transitory computer-usable (e.g., readable, writeable, etc.) medium, which can be any non-transitory apparatus or device that can contain, store, communicate, propagate or transport instructions, data, computer programs, software, code routines, etc., for processing by or in connection with a processor. In some implementations, the storage devices 110*a*, 110*b* through 110*n* communicate and cooperate with the storage logic 104 via signal lines 126*a*, 126*b* through 126*n*. While the present disclosure reference to the storage devices 110 as flash memory, it should be understood that in some implementations, the storage devices 110 may include a non-transitory memory such as a dynamic random access memory (DRAM) device, a static random access memory (SRAM) device, or some other memory devices.

Figure 2:
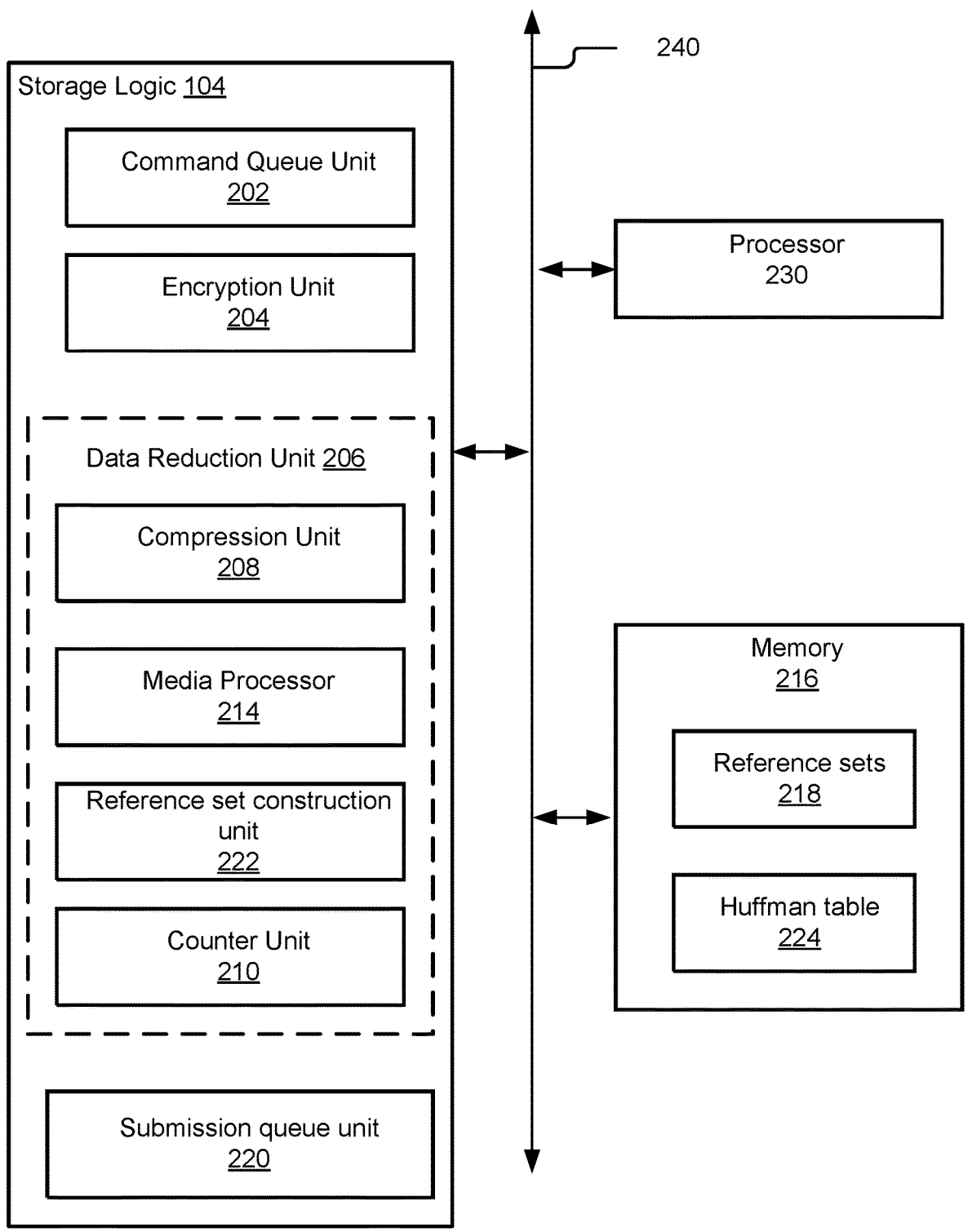
FIG. 2 is a block diagram illustrating example storage logic.

FIG. 2 is a block diagram illustrating an example data deduplicating system. The storage logic 104 may include combinational logic, firmware, software, code, or routine routines or some combination thereof for constructing reference sets for storage devices 110. As depicted in FIG. 2, the storage logic 104 may include a command queue unit 202, an encryption unit 204, a data reduction unit 206, and a submission queue unit 220, which may be electronically communicatively coupled by a communication bus 240 for cooperation and communication with each other and a processor 230, and a memory 216, although other configurations are possible. These components 202, 204, 206, and 220 are also coupled for communication with the other entities (e.g., storage devices 110) of the system 100.

The communication bus 240 may transfer data between components of a computing device or between computing devices, a network bus system including the network 102 or portions thereof, a processor mesh, various connectors, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The processor 230 may execute software instructions by performing various input/output, logical, and/or mathematical operations. The processor 230 may have various computing architectures to process data signals including, for example, a complex instruction set computer (CISC) architecture, a reduced instruction set computer (RISC) architecture, and/or an architecture implementing a combination of instruction sets. The processor 230 may be physical and/or virtual, and may include a single processing unit or a plurality of processing units and/or cores. In some implementations, the processor 230 may be capable of generating and providing electronic display signals to a display device (not shown), supporting the display of images, capturing and transmitting images, performing complex tasks including various types of feature extraction and sampling, etc.

In one implementation, the command queue unit 202, encryption unit 204, data reduction unit 206, and submission queue unit 220 may be hardware for performing the operations described below. In some implementation, the command queue unit 202, encryption unit 204, data reduction unit 206, and submission queue unit 220 are sets of instructions executable by a processor or logic included in one or more customized processors, to provide its respective functionalities. In some implementations, the command queue unit 202, encryption unit 204, data reduction unit 206, and submission queue unit 220 are stored in a memory and are accessible and executable by a processor to provide its respective functionalities. In further implementations, the command queue unit 202, encryption unit 204, data reduction unit 206, and submission queue unit 220 are adapted for cooperation and communication with a processor and other components of the system 100. The particular naming and division of the units, modules, routines, features, attributes, methodologies and other aspects are not mandatory or significant, and the mechanisms that implement the present invention or its features may have different names, divisions, and/or formats.

The command queue unit 202 is a buffer and may include software, code, or routines for receiving data and commands from one or more devices. In one implementation, the command queue unit 202 receives a data stream (data packets) from one or more devices and prepares them for storage in a non-volatile storage device (e.g. a storage device 110). In some implementations, the command queue unit 202 receives incoming data packets and temporarily stores the data packets into a memory buffer. In further implementations, the command queue unit 202 receives 4K data blocks and allocates them for storage in one or more storage devices 110. In other implementations, the command queue unit 202 may include a queue schedule that queues data blocks of data streams associated with a plurality of devices such that, the storage logic 104 processes the data blocks based on the data blocks corresponding position in the queue schedule. In some implementations, the command queue unit 202 receives a data stream from one or more devices and transmits the data stream to the data reduction unit 206 and/or one or more other components of the storage logic 104 based on the queue schedule.

The encryption unit 204 may include logic, software, code, or routines for encrypting data. In one implementation, the encryption unit 204 receives a data stream from the command queue unit 202 and encrypts the data stream. In some implementations, the encryption unit 204 receives a compressed data stream from the data reduction unit 206 and encrypts the data stream. In further implementations, the encryption unit 204 encrypts only a portion of a data stream and/or a set of data blocks associated with a data stream.

The encryption unit 204, in one implementation, encrypts data blocks associated with a data stream and/or compressed data stream responsive to instructions received from the command queue unit 202. For instance, if a user elects for encrypting data associated with user financials, while opting out from encrypting data associated with general data files (e.g. documents available to public, such as, magazines, newspaper articles, pictures, etc.), the command queue unit 202 receives instructions as to which file to encrypt and provides them to the encryption unit 204. In further implementations, the encryption unit 204 encrypts a data stream and/or compressed data stream based on encryption algorithms. An encryption algorithm can be user defined and/or known-encryption algorithms such as, but not limited to, hashing algorithms, symmetric key encryption algorithms, and/or public key encryption algorithms. In other implementations, the encryption unit 204 may transmit the encrypted data stream to data reduction unit 206 to perform its acts and/or functionalities thereon.

The data reduction unit 206 may be logic, software, code, or routines for reducing/encoding a data stream by receiving a data block, processing the data block and outputs an encoded/reduced version of the data block as well as managing the corresponding reference blocks. In one implementation, the data reduction unit 206 receives incoming data and/or retrieves data, reduces/encodes a data stream, tracks data across system 100, clusters reference blocks into reference sets, retires reference blocks and/or reference sets using garbage collection, and updates information associated with a data stream. The particular naming and division of the modules, routines, features, attributes, methodologies and other aspects are not mandatory or significant, and the mechanisms that implement the present invention or its features may have different names, divisions and/or formats. As depicted in FIG. 2, the data reduction unit 206 may include a compression unit 208, a counter unit 210, a media processor 214, and a reference set construction unit 222.

In some implementations, the components 208, 210, 214, and 222 are electronically communicatively coupled for cooperation and communication with each other, and/or the other components of the storage logic 104. In some implementations, the components 208, 210, 214, and 222 may be stored in memory (e.g., main computer memory or random access memory) and include sets of instructions executable by a processor. In any of these implementations, the compression unit 208, the counter unit 210, the media processor 214, and the reference set construction unit 222 are adapted for cooperation and communication with a processor and other components of the storage logic 104.

The compression unit 208 may include logic, software, code, or routines for reducing the amount of storage required to store data including encoding and decoding data blocks. In some implementations, the compression unit 208 may compress data using similarity based data deduplication. The compression unit 208 may generate and analyze identifiers of data blocks associated with a data stream using Rabin Fingerprinting. For example, the compression unit 208 may analyze information associated identifier information (e.g., digital signatures, fingerprints, etc.) of the data blocks associated with an incoming data stream by parsing a data store (e.g., stored in a storage device 110) for one or more reference blocks that match the data blocks of the incoming stream. The compression unit 208 may then analyze the fingerprints by comparing the fingerprints of the data blocks to the fingerprints associated with the reference blocks.

In some implementations, the compression unit 208 applies a similarity based algorithm to detect similarities between incoming data blocks and data previously stored in a storage device 110. The compression unit 208 may identify a similarity between data blocks and previously stored data blocks using resemblance hashes (e.g., hash sketches) associated with the incoming data blocks and the previously stored data blocks.

In one implementation, compression of a data stream, data block, and/or data packet by the compression unit 208 can be based on a size of the corresponding data stream, data block, and/or the data packet. For example, a data stream, data block, and/or data packet received by the compression unit 208 can be of a predefined size (e.g., 4 bytes, 4 kilobytes, etc.), and the compression unit 208 may compress the data stream, the data block, and/or the data packet based on the predefined size to a compressed size. In other implementations, the compression unit 208 may compress a data stream including data blocks based on a compression algorithm such as, but not limited to, an encoding algorithm, deduplication algorithm, etc.

In some implementations, the compression unit 208 encodes data blocks from an incoming data stream. The data stream may be associated with a file and the data blocks are content defined chunks of the file. The compression unit 208 may determine a reference block for encoding data blocks based on a similarity between information associated with identifiers of the reference block and that of the data block. The identifier information may include information such as, content of the data blocks/reference set, content version (e.g. revisions), calendar dates associated with modifications to the content, data size, etc. In further implementations, encoding data blocks of a data stream may include applying an encoding algorithm to the data blocks of the data stream. A non-limiting example of an encoding algorithm, may include, but is not limited to, a deduplication/compression algorithm.

In some implementations, the compression unit 208 may determine a reference set for encoding data blocks based on a similarity between information associated with identifiers of the reference set and that of the data block. In further implementations, the compression unit 208 may determine which reference set to use for encoding data blocks based on the goal of storing the data blocks. The example goals may be, but are not limited to, time efficiency, deduplication ratio, and the overall computing cost, etc.

The counter unit 210 may include a storage register or memory and logic or routines for assigning a count associated with data. In some implementations, the counter unit 210 updates a use count of reference blocks and/or reference sets. For example, the counter unit 210 may track the number of times reference blocks and/or reference sets are used. In one implementation, a use count variable is assigned to a reference set. The use count variable of the new reference set may indicate a data recall number associated with a number of times data blocks or sets of data blocks reference the reference set.

The media processor 214 may include logic, software, code, or routines for determining a dependency of one or more data blocks to one or more reference sets and/or reference blocks. A dependency of one or more data blocks to one or more reference sets may reflect a common reconstruction/encoding dependency of one or more data blocks to one or more reference sets for call back. For instance, a data block (i.e. an encoded data block) may rely on a reference set for reconstructing the original data block such that the original information associated with the original data block (e.g., the un-encoded data block) can be provided for presentation to a client device. Additional operations of the media processor 214 are discussed elsewhere herein.

The reference set construction unit 222 may include software, code, logic, or routines for constructing reference sets 218 during storage process. In one implementation, the reference set construction unit 222 may receive data (e.g., data block) and analyze whether a similarity exists between the data blocks and the reference blocks in the active reference set. When it is determined that there is no similarity, the reference set construction unit 222 may aggregate these data blocks into a set of data blocks and generate new reference block using the set of data blocks. It should be recognized that the reference sets may include, but are not limited to, a local reference set, a global reference set, a namespace reference set, a domain reference set, and a synthetic reference set, etc. The reference set construction unit 222 may have different construction mechanism for each type of these reference sets. The detailed construction process for each of these reference sets are described elsewhere herein.

The memory 216 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with a processor. The memory 216 may store instructions and data, including, for example, an operating system, hardware drivers, other software applications, modules, components of the storage logic 104, databases, etc. For example, the memory 216 may store and provide access to reference sets 218 and Huffman table 224. In some implementations, the memory 216 may include a non-transitory memory such as a dynamic random access memory (DRAM) device, a static random access memory (SRAM) device, or some other memory devices.

Reference sets 218 may be stored in the memory 216. The reference sets 218 should also be stored in the storage devices 110, so that they may be recovered or initiated after a shutdown of the storage devices 110. In some instances, the reference sets 218 may be synced between the memory 216 and the storage devices 110, for example, periodically or based on some trigger. Reference sets define groups of reference blocks against which data blocks are encoded and decoded. A reference set may include a mapping of which data blocks belong to that reference set. For example, in some implementations, a reference set includes a bitmap or a binary number where each bit maps whether a reference block corresponding to that bit is included in the reference set. In some instances, when the bitmap for a particular reference set is zero (e.g., no reference blocks are associated with the reference set) the reference set may be deleted. In some implementations, the reference sets 218 may also include an indication of segments in the storage device 110 that use one or more reference blocks in the reference set for encoding/decoding, according to the techniques described herein.

In some implementations, the reference sets may include, but are not limited to, a local reference set, a global reference set, a namespace reference set, a domain reference set, and a synthetic reference set, etc. These reference sets are constructed by the reference set construction unit 222 of the storage logic 104 during the storage process and may be used to deduplicate incoming data stream.

Huffman table 224 may be stored in memory 216. The Huffman table 224 should also be stored in the storage devices 110, so that they may be recovered or initiated after a shutdown of the storage devices 110. In some instances, the Huffman table 224 may be synced between the memory 216 and the storage devices 110, for example, periodically or based on some trigger. Huffman table 224 may be used to compress data stream in the storage devices 110.

The submission queue unit 220 may include software, code, logic, or routines for queuing data for storage. In one implementation, the submission queue unit 220 receives data (e.g. data block) and temporally stores the data into a memory buffer (not shown). For instance, the submission queue unit 220 can temporarily store a data stream in a memory buffer while, waiting for one or more components to complete processing of other tasks, before transmitting the data stream to the one or more components to perform its acts and/or functionalities thereon. In some implementations, the submission queue unit 220 receives data blocks and allocates the data blocks for storage in one or more storage devices 110. In further implementations, the submission queue unit 220 receives a data stream from the data reduction unit 206 and transmits the data stream to the storage devices 110 for storage.

Figure 3:
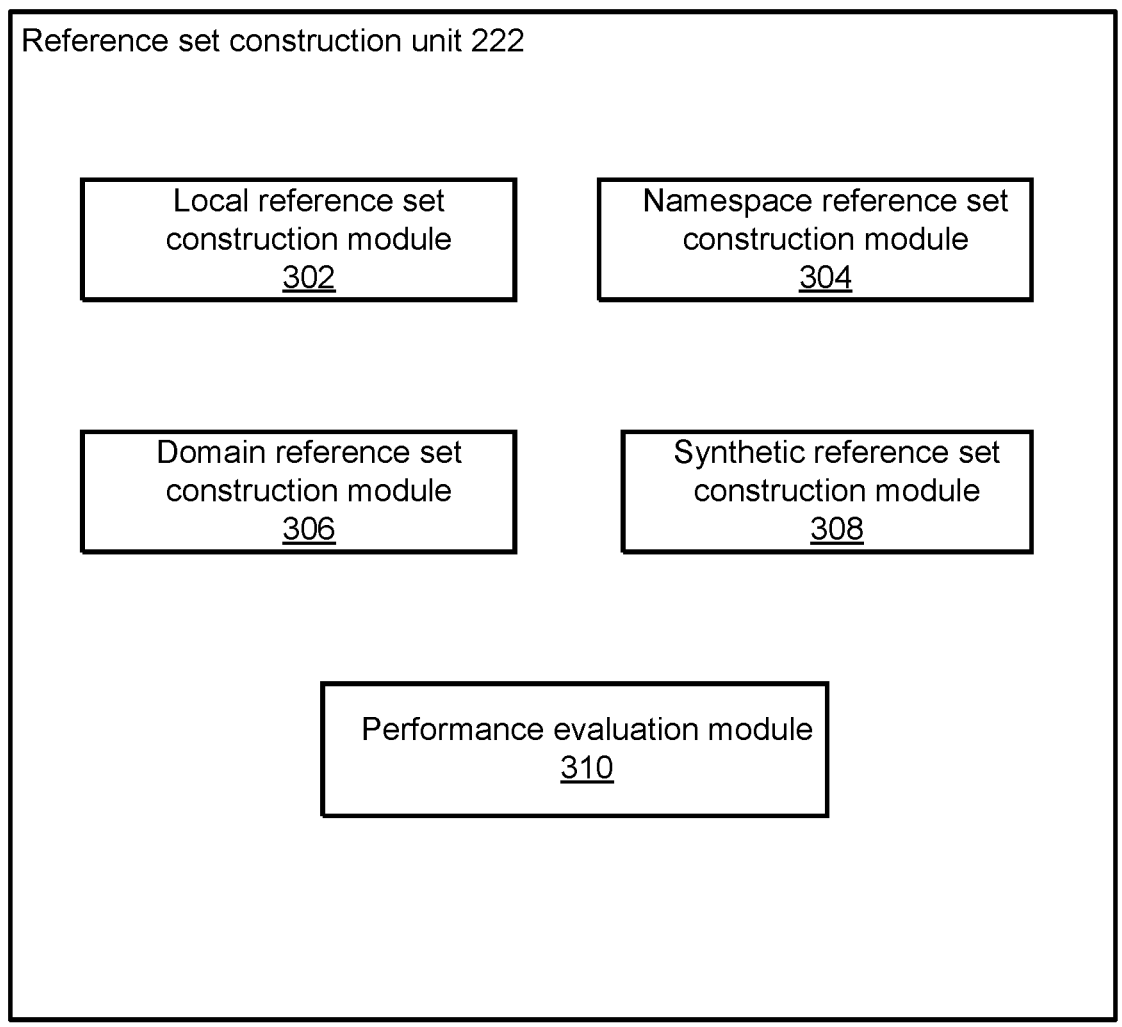
FIG. 3 is a block diagram illustrating an example reference set construction unit.

FIG. 3 is a block diagram illustrating an example reference set construction unit 222 according to the techniques described herein. The reference set construction unit 222 may include logic, firmware, code, or routines or some combination thereof for constructing reference set in the storage devices 110. As depicted in FIG. 3, the reference set construction unit 222 may include a local reference set construction module 302, a namespace reference set construction module 304, a domain reference set construction module 306, a synthetic reference set construction module 308, and a performance evaluation module 310, which may be electronically communicatively coupled by a communication bus (not shown) for cooperation and communication with each other, although other configurations are possible. These components 302, 304, 306, 308, and 310 are also coupled for communication with other entities of the storage logic 104 and other entities (e.g., storage devices 110) of the system 100.

In one implementation, the local reference set construction module 302, namespace reference set construction module 304, domain reference set construction module 306, synthetic reference set construction module 308, and performance evaluation module 310 may be hardware for performing the operations described below. In some implementations, the local reference set construction module 302, namespace reference set construction module 304, domain reference set construction module 306, synthetic reference set construction module 308, and performance evaluation module 310 are sets of instructions executable by a processor or logic included in one or more customized processors, to provide its respective functionalities. In some implementations, the local reference set construction module 302, namespace reference set construction module 304, domain reference set construction module 306, synthetic reference set construction module 308, and performance evaluation module 310 are stored in a memory and are accessible and executable by a processor to provide its respective functionalities. In further implementations, the local reference set construction module 302, namespace reference set construction module 304, domain reference set construction module 306, synthetic reference set construction module 308, and performance evaluation module 310 are adapted for cooperation and communication with a processor and other components of the system 100. The particular naming and division of the units, modules, routines, features, attributes, methodologies and other aspects are not mandatory or significant, and the mechanisms that implement the present invention or its features may have different names, divisions, and/or formats.

The local reference set construction module 302 is a buffer and may include software, code, or routines for constructing local reference set. A local reference set defines a reference set that is generated only by the data blocks that store in the same chunk of the storage devices 110. A chunk is a contiguous range of physical blocks that is filled sequentially and erased as a unit. In one implementation, the local reference set construction module 302 may receive a data stream including one or more data blocks from one or more devices and prepares them for storage in a non-volatile storage device (e.g., a storage device 110). In some implementations, the local reference set construction module 302 may identify which chunk these data blocks in the data stream are stored in based on the write command associated with the data stream. In further implementations, the local reference set construction module 302 may retrieve the local reference set from the chunk in which the data blocks intend to store. It should be recognized that only when there is a local reference set in this chunk, the local reference set construction module 302 retrieves the local reference set. The local reference set construction module 302 may generate the local reference set afresh if there is no local reference set exists in this chunk.

In some implementations, the local reference set construction module 302 may transmit the local reference set and the data blocks to compression unit 208 to process. The compression unit 208 may encode each of the data blocks using the local reference set. In some implementations, the compression unit 208 may analyze whether a similarity exists between the data blocks and the local reference set before encoding the data blocks. In some implementations, when there is no similarity between the data blocks and the local reference set, the local reference set construction module 302 may aggregate data blocks into a set of data blocks and generate new local reference blocks using the set of data blocks. The operations described herein may be similar as the ones in steps 514-518 in FIG. 5.

The local reference set construction module 302 may further package the local reference set along with the data blocks and store the local reference set in the same chunk with the data blocks. It should be recognized that the local reference set is constructed only with the data blocks within a chunk. Therefore, the local reference set is always available to the data blocks within the chunk. Thus, there is no need to bookkeep the use count for the local reference set. This leads to minimum management overhead.

The namespace reference set construction module 304 is a buffer and may include software, code, or routines for constructing namespace reference set. A namespace can be seen as containers of data within a storage system. It should be recognized that each namespace hosts data blocks of similar characteristics, i.e., data blocks written into a namespace could be interpreted as if they belong to the same data stream. Examples of different namespaces may include, but are not limited to, Email data, payroll data, employee data, etc. It should be recognized that these are merely examples and various examples of namespaces can be used to implement the present disclosure. The storage devices 110 may have customized namespaces based on the use of the storage devices 110. For each of these namespaces, the namespace reference set construction module 304 may create a set of reference blocks for a deduplication process, which is called a namespace reference set. It is understandable that the data blocks heading to one of these namespaces have similar characteristics, thus leads to better deduplication ratio when using a namespace reference set to deduplicate incoming data blocks.

In some implementations, the namespace reference set construction module 304 may receive a data stream including one or more data blocks from one or more devices and prepares them for storage in a non-volatile storage device (e.g., a storage device 110). In some implementations, the namespace reference set construction module 304 may perform namespace analysis on the data stream. In one implementation, the namespace analysis performed on the data stream may be a process that identifies the source of the data stream, e.g., based on the application traffic. In another implementation, the namespace analysis may be a process that identifies the characteristics of the incoming data stream.

The namespace reference set construction module 304 may identify a namespace for the incoming data stream based on the namespace analysis. The incoming data stream is stored in the identified namespace. In some implementations, the namespace reference set construction module 304 may encode each of the one or more data blocks using the namespace reference set of the identified namespace. It should be recognized that the namespace reference set construction module 304 may generate the namespace reference set afresh if there is no namespace reference set in the identified namespace.

The domain reference set construction module 306 is a buffer and may include software, code, or routines for constructing domain reference set. A domain reference set may be a reference set that is pre-configured prior to the data stream storage process. For instance, one particular example of domain reference set may be a reference set for financial data, which may be pre-configured ahead of time and is ready for use immediately. In this case, the system 100 does not need to create a reference set incrementally during the procedure of storing data stream.

In some implementations, the domain reference set construction module 306 may receive a data stream including one or more data blocks from one or more devices and prepares them for storage in a non-volatile storage device (e.g., a storage device 110). In some implementations, the domain reference set construction module 306 may perform domain analysis on the data stream and identify which domain the incoming data stream is belong to. Further, the domain reference set construction module 306 may retrieve a domain reference set of the identified domain. It should be recognized that the domain reference set may be a pre-configured reference set that is ready to use.

The synthetic reference set construction module 308 is a buffer and may include software, code, or routines for constructing synthetic reference set. A synthetic reference set may be a reference set for the repeating data blocks sequences. For instance, the "from," "to," "CC" in an email type of data may be a typical example of repeating data blocks. These repeating data may widely exist in file headers, common protocol headers, HTML and XML tags, etc.

In some implementations, the synthetic reference set construction module 308 may identify a repeating data block sequence and create synthetic reference set for the repeating data block. It should be recognized that the synthetic reference set may be considered as a pre-configured reference set too.

The performance evaluation module 310 is a buffer and may include software, code, or routines for evaluating the performance of different reference sets. Based on different characteristics of a data stream and/or the goal of the storage process, an incoming data stream may be better deduplicated by one reference set than another. There are various criteria that can be used to determine the performance of different reference sets, for example, computing resources, storage speed, deduplication ratio, etc. In some implementations, the performance evaluation module 310 may evaluate reference sets before the deduplication process and identify the reference set that will be used in the deduplication process to get the intended results.

Figure 4:
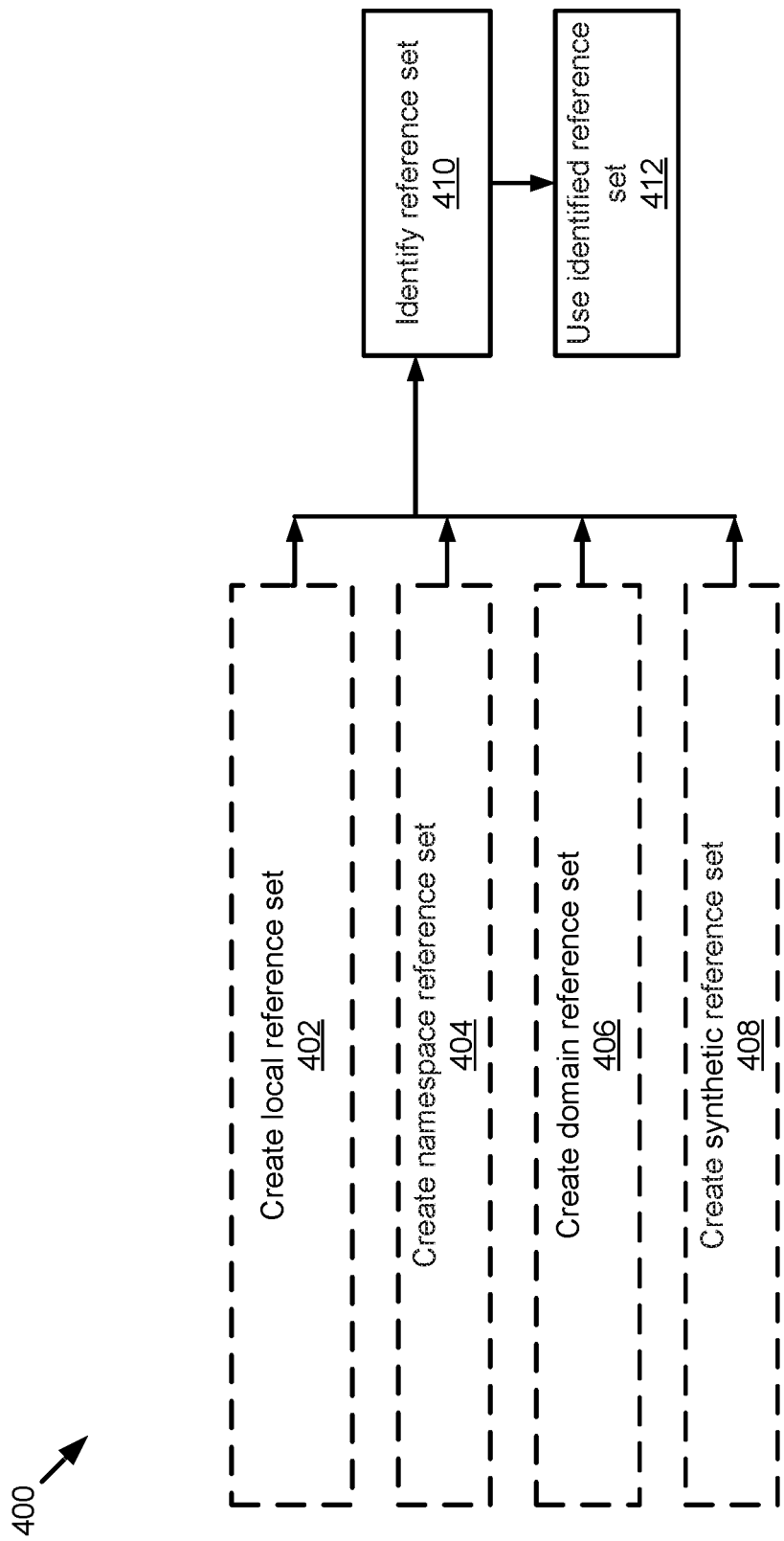
FIG. 4 is a flowchart of an example method for reference block construction in a storage device.

FIG. 4 is a flowchart of an example method 400 of reference block construction in a storage device 110 according to the techniques described herein. As depicted in FIG. 4, the method 400 may begin with any one or combination of steps 402, 404, 406, or 408. In some implementations, some of these steps may be performed in parallel. It should be recognized that not all of these steps are required for method 400 to proceed to step 410.

As depicted in FIG. 4, in step 402, the method 400 may create a local reference set. The operation performed in step 402 may be performed by the local reference set construction module 302 of the reference set construction unit 222. As discussed above, a local reference set may be a reference set that is generated only by the data blocks that store in the same chunk of the storage devices 110. A chunk is a contiguous range of physical blocks that is filled sequentially and erased as a unit.

In step 404, the method 400 may create a namespace reference set. The operation performed in step 404 may be performed by the namespace reference set construction module 304 of the reference set construction unit 222. As discussed above, a namespace reference set may be a reference set that is special for a namespace, which stores data with similar characteristics.

In step 406, the method 400 may create a domain reference set. The operation performed in step 406 may be performed by the domain reference set construction module 306 of the reference set construction unit 222. As discussed above, a domain reference set may be a reference set that is pre-configured for a particular domain, such as financial data domain.

In step 408, the method 400 may create a synthetic reference set. The operation performed in step 408 may be performed by the synthetic reference set construction module 308 of the reference set construction unit 222. As discussed above, a synthetic reference may be a reference set for the repeating data blocks, such as the "from," "to," "CC" in an email type of data may be a typical example of repeating data blocks.

The method 400 may continue by identifying 410 a reference set. In some implementations, the compression unit 208 may identify the reference set based on the write command associated with the incoming data stream. In some other implementations, the compression unit 208 may identify the reference set based on the results from the performance evaluation module 310. As discussed above, the performance evaluation module 310 may use various criteria to determine the performance of different reference sets and select one to deduplicate the data stream. In yet some other implementations, the compression unit 208 may identify the reference set by analyzing the incoming data stream.

The method 400 may continue by using 412 the identified reference set. In some implementations, the compression unit 208 may encode the incoming data blocks using the identified reference set. In some other implementations, the operation performed in step 412 may be performed by the compression unit 208 in cooperation with reference set construction unit 222 as well as one or more other components of the system 100.

Figure 5A:
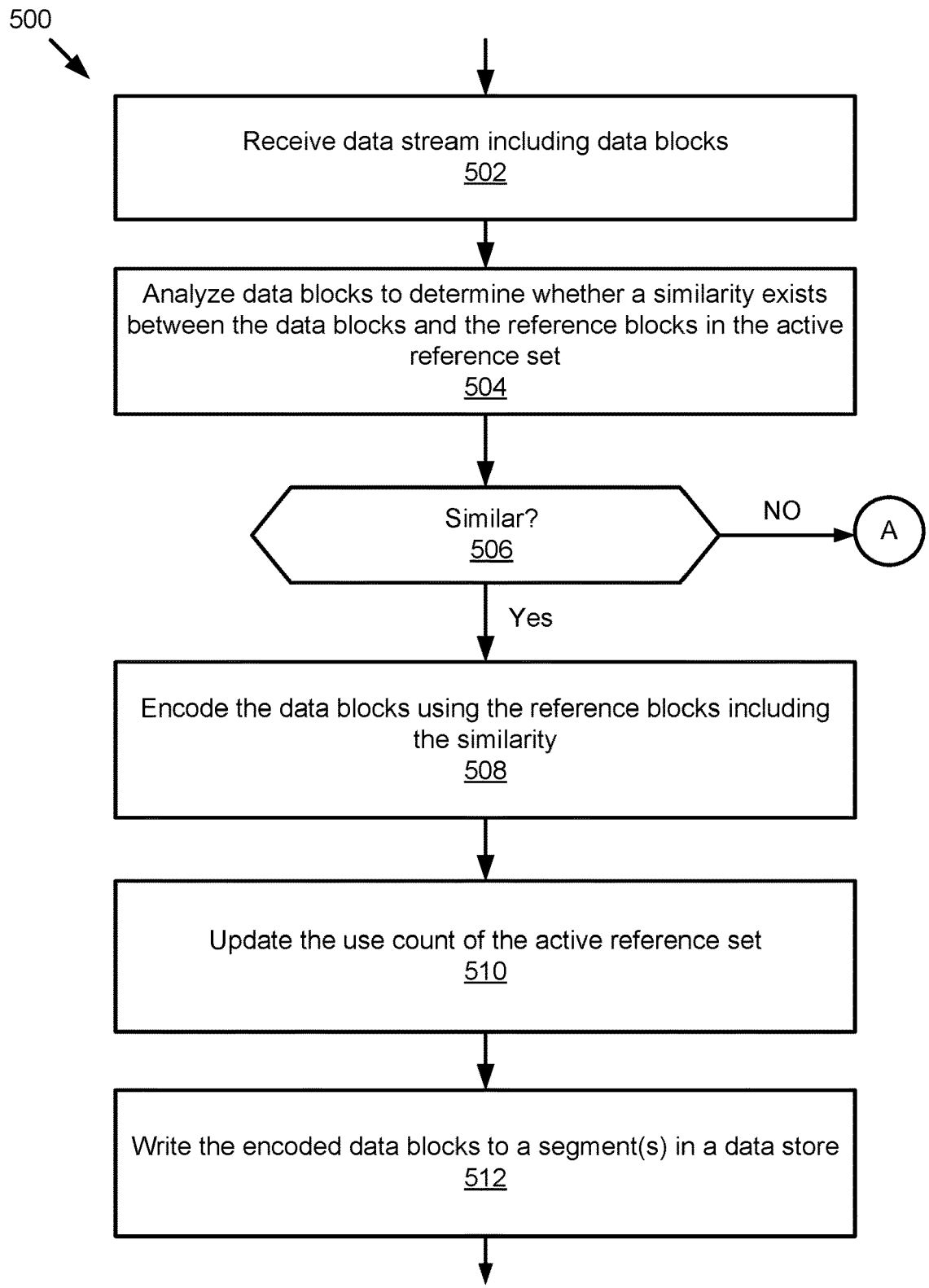
FIGS. 5A and 5B are flow charts of an example method for encoding data blocks and aggregating corresponding reference blocks into reference sets.
Figure 5B:
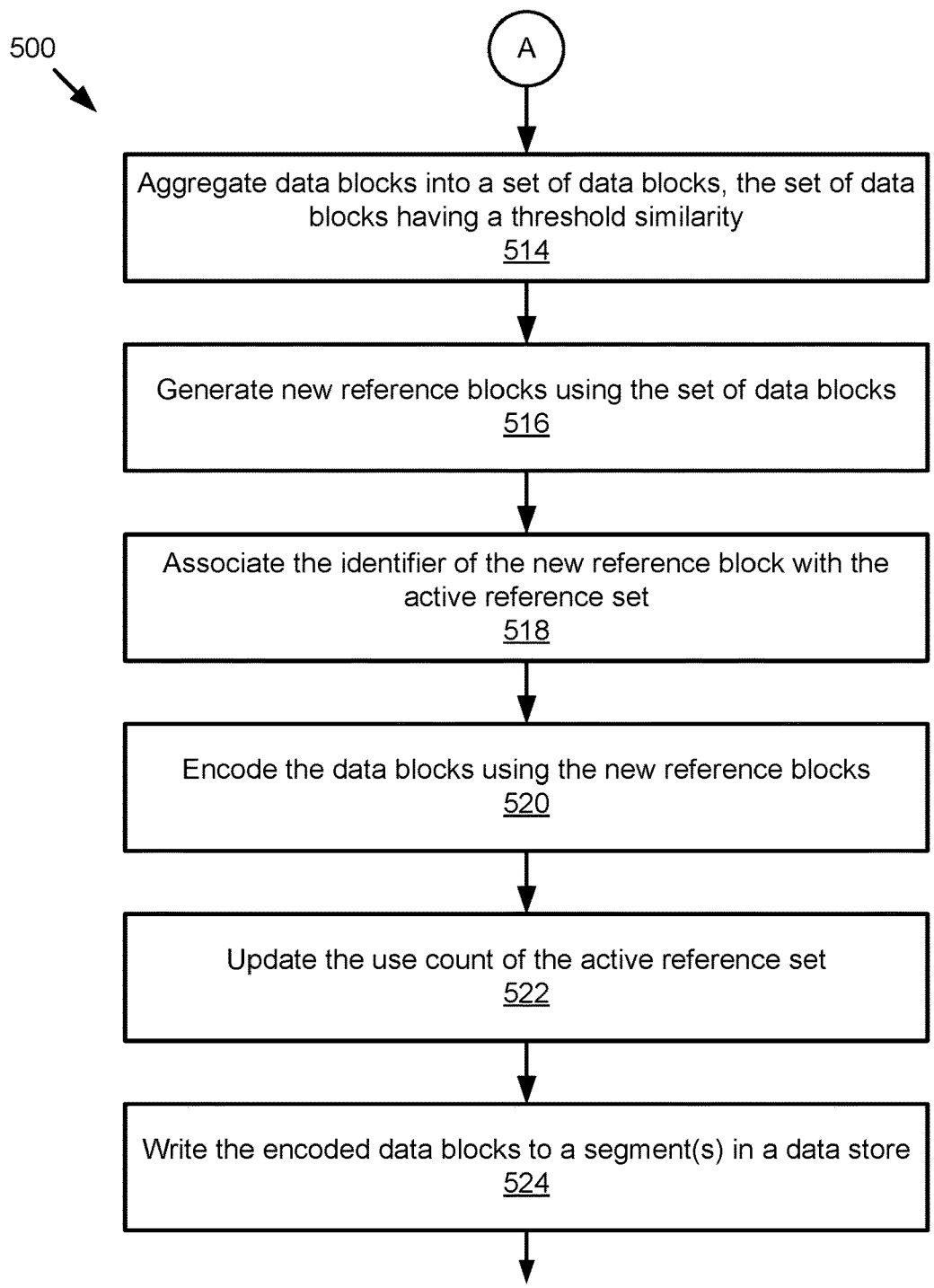

FIGS. 5A and 5B are flow charts of an example method 500 for encoding data blocks and aggregating corresponding reference blocks into reference sets. At 502, the compression unit 208 receives a data stream including data blocks and, at 504, the compression unit 208 analyzes data blocks to determine whether a similarity exists between the data blocks and the active reference set (e.g., a similarity between the data blocks and past data blocks encoded using reference blocks, and reference blocks, and fingerprints, etc., of reference blocks). For example, the compression unit 208 may utilize an encoding algorithm to identify similarities between each data block of the set of data blocks associated with the data stream and the reference set stored in in the storage device 110. The similarities may include, but are not limited to, a degree of similarity between data content (e.g. content-defined chunks of each data block) and/or identifier information associated with each data block of the set of the data blocks and data content and/or identifier information associated with the reference set. It should be recognized that the reference set herein may be any of the local, namespace, domain, or synthetic reference sets.

In some implementations, the compression unit 208 can use a similarity-based algorithm to detect resemblance hashes (e.g. sketches) which have the property that similar data blocks and reference sets have similar resemblance hashes (e.g. sketches). Therefore, if the set of data blocks are similar based on corresponding resemblance hashes (e.g. sketches) to an existing reference set stored in storage, it can be encoded relative to the existing reference set.

If at 506, the compression unit 208 determines that the incoming data blocks are similar, then the method 500 continues to 508, where the compression unit 208 encodes the data blocks using the reference blocks including the similarity. In some implementations, data blocks can be segmented into chunks of data blocks in which the chunks of data blocks may be encoded exclusively. In one implementation, the compression unit 208 may encode each data block of the new set of data blocks using an encoding algorithm (e.g. deduplication/compression algorithm). An encoding algorithm may include, but is not limited to, delta encoding, resemblance encoding, and delta-self compression.

At 510, the counter unit 210 may update the use count of the active reference set. For example, as described above, the counter unit 210 may track the number of times reference blocks and/or reference sets are used. In one implementation, a use count variable is assigned to the new reference set. The use count variable of the new reference set may indicate a data recall number associated with a number of times data blocks or sets of data blocks reference the new reference set. In further implementations, the use count variable may be part of the hash and/or a header associated with the reference set. It should be recognized that, for a local reference set, there is no use count that needs to be tracked. This is because the local reference set is managed along with the data blocks and stored in the same chunk, the local reference set is always available to the data blocks that rely on it.

In some implementations, a reference set may be satisfied for deletion when a count of the use count variable of the reference set decrements to zero. A use count variable of zero may indicate that no data blocks or sets of data blocks rely on a (e.g. reference to a) corresponding stored reference set for regeneration. In further implementations, the media processor 214 may cause a reference set to be deleted based on the use count variable. For instance, after reaching the certain count, the media processor 214 can cause the reference set to be deleted by applying a garbage collection algorithm (and/or any other algorithm well-known in the art for data storage cleanup) on the reference set.

At 512, the submission queue unit 220 writes the encoded data blocks to one or more segments in the storage device 110.

If the compression unit 208 determines at 506 that the incoming data blocks are not similar to existing reference blocks (e.g., similar to the data blocks represented by the existing reference blocks), then the method 500 continues to 514, where the compression unit 208 aggregates data blocks into a set of data blocks, the set of data blocks having a threshold similarity to each other. The data blocks are aggregated based on a similarity criterion and differentiate from the reference blocks in the active reference set. A criterion may include, but is not limited to, similarity determinations, as described elsewhere herein, content associated with each data block, administrator defined rules, data size consideration for data blocks and/or sets of data blocks, random selection of hashes associated with each data block, etc. For instance, a set of data blocks may be aggregated together based on the data size of each corresponding data block being within a predefined range. In some implementations, one or more data blocks may be aggregated based on a random selection. In further implementations, a plurality of criteria may be used for aggregation.

At 516, the compression unit 208 generates new reference blocks using the set of data blocks. In one implementation, the method 500 generates a new reference block based on the one or more data blocks sharing content that is within a degree of similarity between each of the set of data blocks. In some implementations, responsive to generating the new reference block, the compression unit 208 may generate an identifier (e.g. fingerprint, hash value, etc.) for the new reference block, although it should be understood that other implementations for creating a reference block are possible.

At 518, the compression unit 208 and/or the media processor 214 associates the new reference blocks with the active reference set (e.g., by adding an identifier of the new reference blocks to metadata of the active reference set). In some implementations, the association between reference blocks may be maintained in the metadata of each reference set or in a specific reference association file. For example, in some implementations a reference set has a bitmap indicating whether each reference block is part of that reference set and therefore may be used to encode or decode the data blocks stored in segments that use reference sets for encoding, as described above.

At 520, 522, and 524, the storage logic 104 encodes the data blocks using the new reference blocks, updates the use count of the active reference set, and writes the encoded data blocks to one or more segments in a data store (e.g., the storage device 110) in the same or similar ways to the operations at 508, 510, and 512, respectively. It should be recognized that, for a local reference set, there is no use count needed to be tracked.

Figure 6:
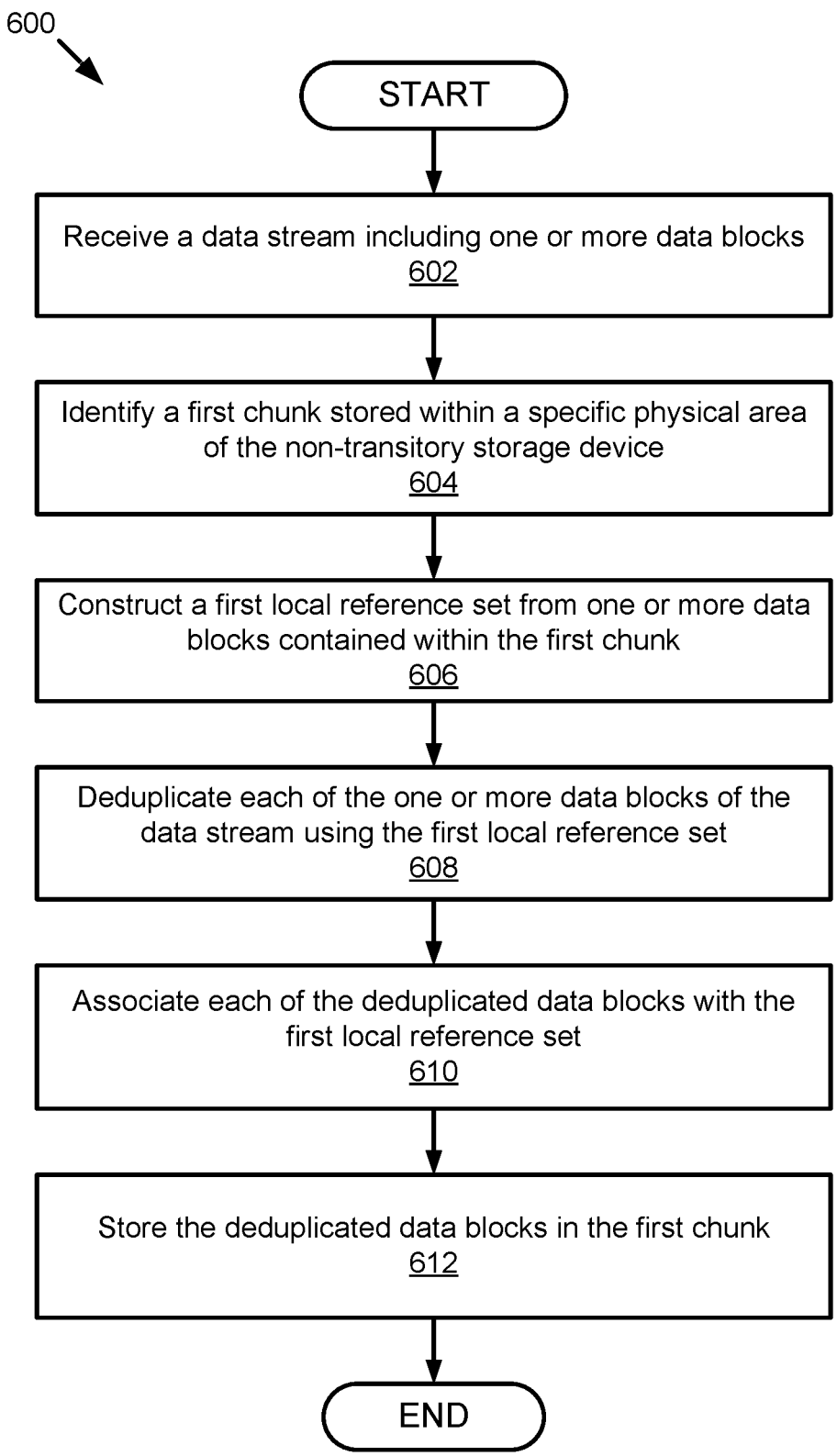
FIG. 6 is a flow chart of an example method for constructing a local reference set.

FIG. 6 is a flow chart of an example method 600 for constructing a local reference set according to the techniques described herein. The method 600 may begin by receiving 602, at a non-transitory storage device, a data stream including one or more data blocks. In some implementations, the command queue unit 202 may receive a data stream including one or more data blocks from one or more devices.

Next, the method 600 may advance by identifying 604 a first chunk within a specific physical area of the non-transitory storage device. The first chunk is stored within a specific physical area of storage device. To ease description, some elements of the system 100 and/or the methods are referred to using the labels first, second, third, etc. These labels are intended to help to distinguish the elements but do not necessarily imply any particular order or ranking unless indicated otherwise. In some implementations, the command queue unit 202 may identify the first chunk that the data stream is stored in based on the write command associated with the data stream.

The method 600 may advance by constructing 606 a first local reference set from the one or more data blocks contained within the first chunk. As discussed above, the local reference set is managed along with the data blocks that stores in the same chunk. In some implementations, the local reference set construction module 302 may construct the local reference set from the chunk in which the data stream intends to store.

Next, the method 600 may continue by deduplicating 608 each of the one or more data blocks using the first local reference set. In some implementations, the compression unit 208 may deduplicate each of the data blocks using the first local reference set. In some implementations, the compression unit 208 may analyze whether a similarity exists between the data blocks and the first local reference set before encoding the data blocks (not shown). In some implementations, when there is no similarity between the data blocks and the local reference set, the local reference set construction module 302 may aggregate data blocks into a set of data blocks and generate new local reference blocks using the set of data blocks. The operations described herein may be similar as the ones in steps 514-518 in FIG. 5.

Next, the method 600 may advance by associating 610 each of the deduplicated data blocks with the first local reference set. Then the method 600 may advance by storing 612 the deduplicated data blocks in the first chunk.

Figure 7:
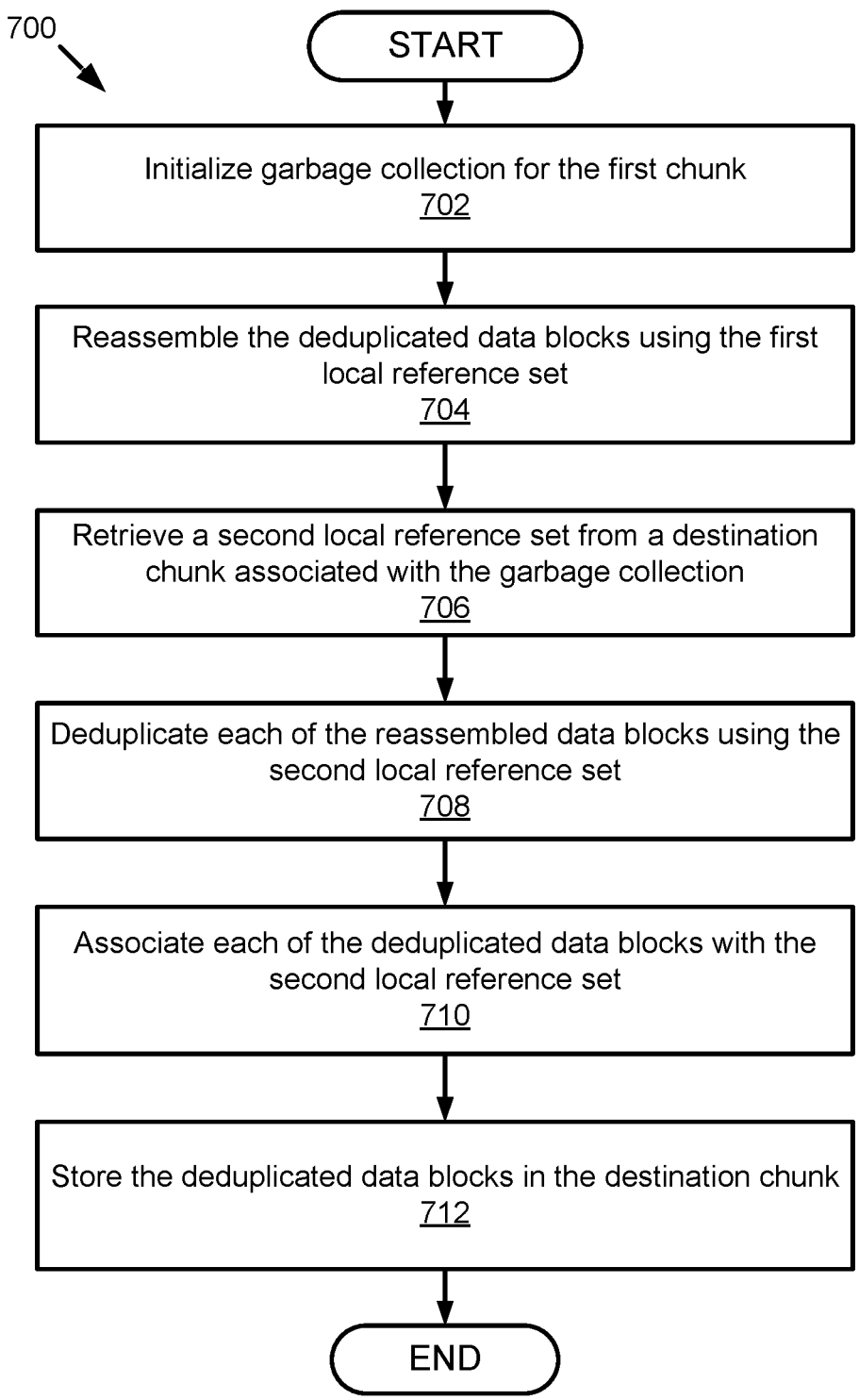
FIG. 7 is a flow chart of an example method for garbage collection using a local reference set.

FIG. 7 is a flow chart of an example method 700 for garbage collection using a local reference set according to the techniques described herein. It should be recognized that method 700 is an optional method following method 600. The method 700 may begin by initializing 702 garbage collection for the first chunk. The operation performed in step 812 may be performed by a garbage collection unit (not shown in figures) or other components of the system 100.

Next, the method 700 may continue by reassembling 704 the deduplicated data blocks using the first local reference set. Next, the method 700 may proceed by retrieving 706 a second local reference set from a destination chunk associated with the garbage collection. The method 700 may continue by deduplicating 708 each of the reassembled data blocks using the second local reference set. The method 700 may further advance by associating 710 each of the deduplicated data blocks with the second local reference set. Then the method 700 may advance by storing 712 the deduplicated data blocks in the destination chunk.

Figure 8:
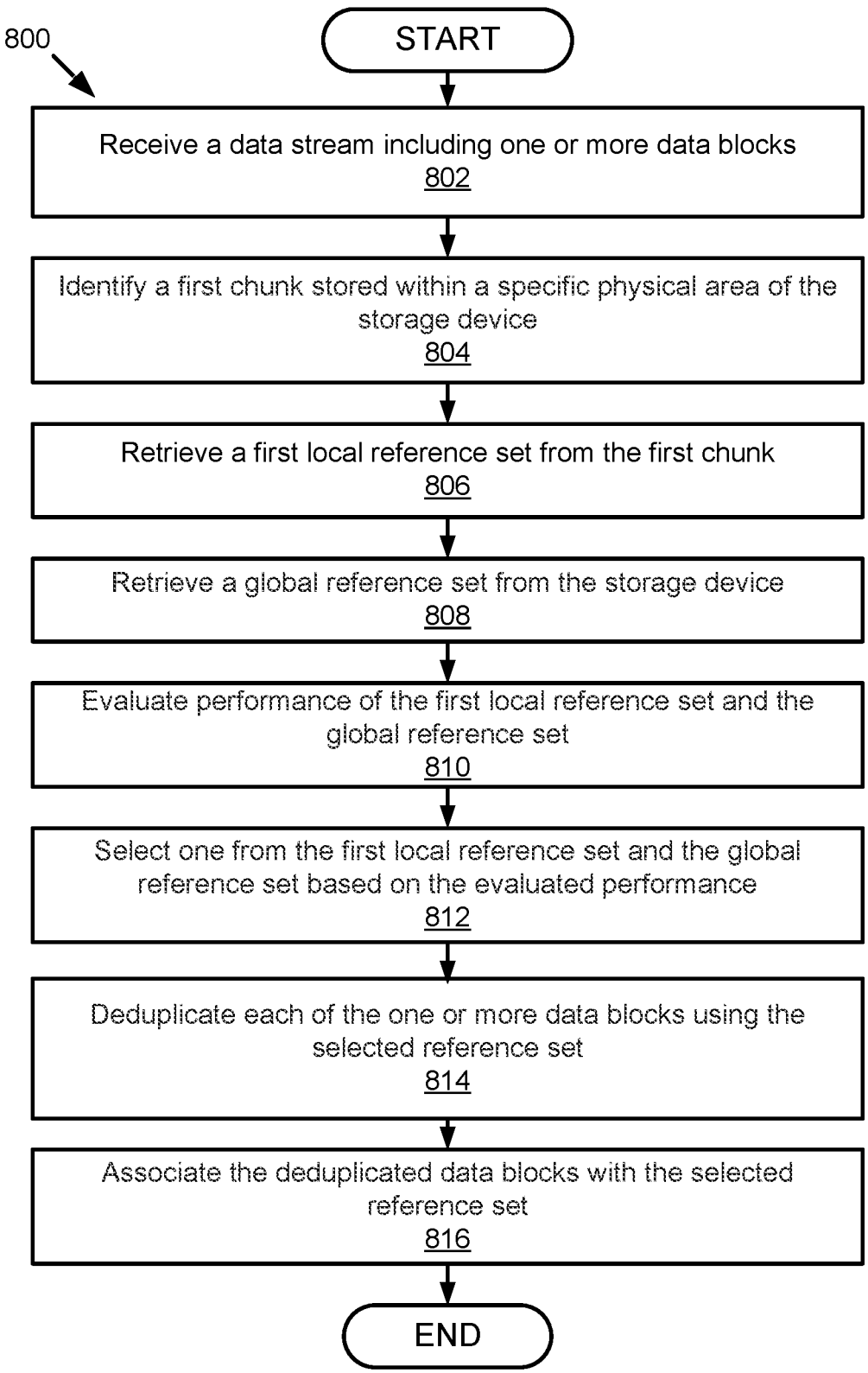
FIG. 8 is a flow chart of an example method for selecting a reference set from a local reference set and a global reference set based on evaluation.

FIG. 8 is a flow chart of an example method 800 for selecting a reference set from a local reference set and a global reference set based on evaluation according to the techniques described herein. The method 800 may begin by receiving 802 a data stream including one or more data blocks. In some implementations, the command queue unit 202 may receive a data stream including one or more data blocks from one or more devices.

Next, the method 800 may advance by identifying 804 a first chunk that the data stream is stored in. The first chunk is stored within a specific physical area of the storage device. In some implementations, the command queue unit 202 may identify which chunk that the data stream is stored in based on the write command associated with the data stream.

The method 800 may advance by retrieving 806 a first local reference set from the first chunk. In some implementations, the local reference set construction module 302 may retrieve the local reference set from the chunk identified in step 804.

Next, the method 800 may continue by retrieving 808 a global reference set from the storage device. It should be recognized that a global reference set may be a reference set that manages reference information spread across the devices and spread across data blocks arrival time.

The method 800 may advance by evaluating 810 the performance of the first local reference set and the global reference set. In some implementations, the performance evaluation module 310 may evaluate the performance of the first local reference set and the global reference set based on the goal of the storage process. The criteria for the performance evaluation may include, but is not limited to, computing resources occupied, storage speed, deduplication ratio, etc.

Next, the method 800 may advance by selecting 812 one reference set from the first local reference set and the global reference set. In some implementations, the compression unit 208 may select one reference set from the first local reference set and the global reference set based on the performance. For example, when the goal of the storage process focuses on storage speed, then the local reference set may be better for it. That is because compared to the global reference set, the local reference set has a smaller number of reference blocks. Therefore, the storage speed, which partially depends on the deduplication speed, is greater than that of the global reference set. In some other implementations, when the goal of the storage process focuses on deduplication ratio, then the performance evaluation module 310 may run the local and the global reference sets and determine which one of them can provide the better deduplication ratio. It should be recognized that because the global reference set manages information spreads across the storage devices and spreads across the data blocks arrival time, the global reference set may achieve better deduplication ratio.

Next, the method 800 may advance by deduplicating 814 each of the one or more data blocks using the selected reference set. In some implementations, the compression unit 208 may deduplicate each of the one or more data blocks using the selected reference set. The method 800 may continue by associating 816 the deduplicated data blocks with the selected reference set.

Figure 9:
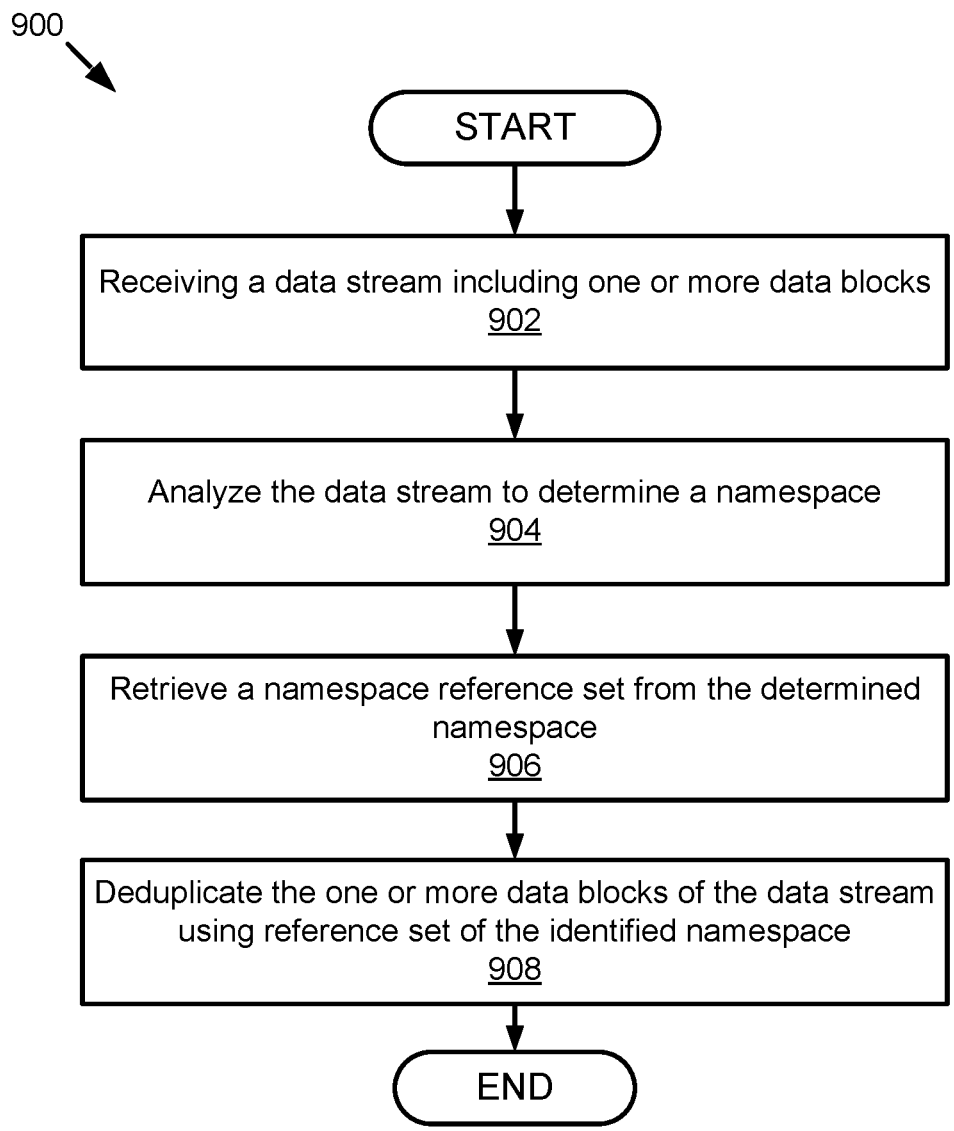
FIG. 9 is a flow chart of an example method for constructing a namespace reference set.

FIG. 9 is a flow chart of an example method 900 for constructing a namespace reference set according to the techniques described herein. As discussed above, a namespace can be seen as container of data within a storage system. It should be recognized that each namespace hosts data blocks of similar characteristics, i.e., data blocks written into a namespace could be interpreted as if they belong to the same data stream. Examples of different namespaces may include, but are not limited to, Email data, payroll data, employee data, etc. In some implementations, the storage devices 110 may have customized namespaces based on the use of the storage devices 110. For each of these namespaces, the namespace reference set construction module 304 may create a set of reference blocks for deduplication process, which is called a namespace reference set. It is understandable that the data blocks heading to one of these namespaces have similar characteristics, thus leads to better deduplication ratio when using a namespace reference set to deduplicate incoming data blocks.

The method 900 may begin by receiving 902 a data stream including one or more data blocks. In some implementations, the command queue unit 202 may receive the data stream including one or more data blocks from one or more devices.

Next, the method 900 may continue by analyzing 904 the data stream to determine a namespace. In some implementations, analyzing the data stream may be a process that identifies the source of the data stream. In some other implementations, the namespace analysis may be a process that identifies the characteristics of the incoming data stream.

Next, the method 900 may advance by retrieving 906 a namespace reference from the determined namespace. The operation performed in step 906 may be performed by the command queue unit 202 in cooperation with one or more other components of the system 100.

The method 900 may continue by deduplicating 908 each of the one or more data blocks using the namespace reference set of the determined namespace. The operation performed in step 908 may be performed by compression unit 208 in cooperation with one or more other components of the system 100. As depicted in FIG. 5, the process of deduplicating data blocks using the reference set may include the process of constructing the reference set. When there is similarity between the incoming data stream and the available reference set, the system 100 may encode the data blocks in the data stream based on the reference set. When there is no similarity between the incoming data stream and the available reference set, the system 100 may aggregate data blocks into a set of data blocks and generate new reference set using the set of data blocks. The operation described herein may be similar as the ones in steps 514-518 in FIG. 5.

Figure 10:
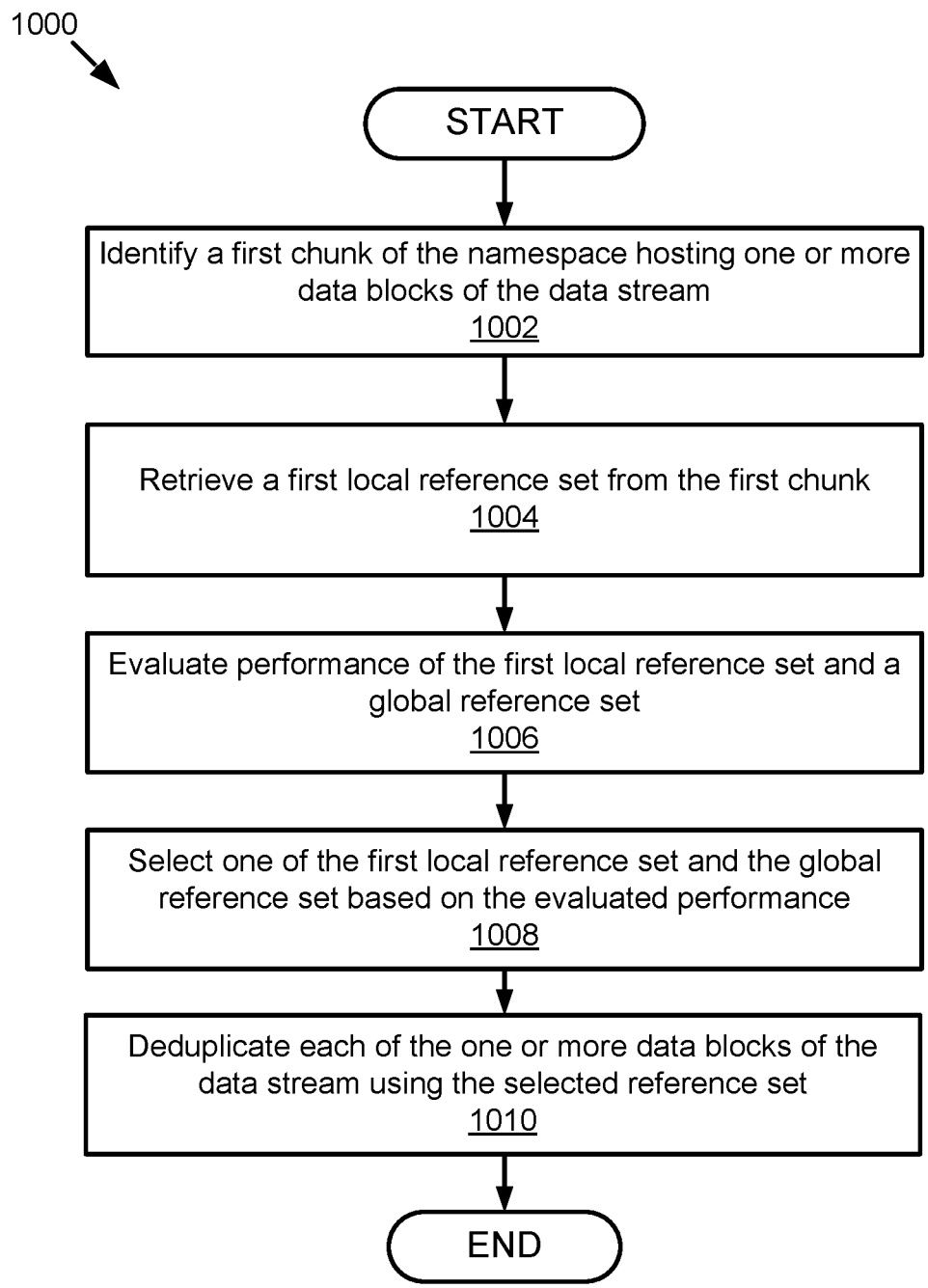
FIG. 10 is a flow chart of an example method for selecting a reference set from a local reference set and a global reference set based on evaluation and namespace.

FIG. 10 is a flow chart of an example method 1000 for selecting a reference from a local reference and a global reference set based on evaluation and namespace according to the techniques described herein. The method 1000 may begin by identifying 1002 a first chunk of the namespace hosting the data stream. In some implementations, the command queue unit 202 may identify a first chunk of the namespace that the data stream is stored in.

Next, the method 1000 may continue by retrieving 1004 a first local reference set from the first chunk.

Next, the method 1000 may advance by evaluating 1006 performance of the first local reference set and a global reference set. It should be recognized that the global reference set related to the identified namespace may be, or a portion of, the namespace reference set of the identified namespace. In some implementations, the performance evaluation module 310 may evaluate the performance of the first local reference set and the global reference set. As discussed above, the performance evaluation process may be performed based on the goal of the storage process. Various criteria may be implemented to perform the performance evaluation, such as, computing resources occupied, storage speed, deduplication ratio, etc.

Next, the method 1000 may advance by selecting 1008 one reference set of the first local reference set and the global reference set based on the evaluated performance. In some implementations, the compression unit 208 may select one reference set from the first local reference set and the global reference set based on the performance. For example, when the goal of the storage process focuses on storage speed, then the local reference set may be better for it. That is at least because compared to the global reference set, the local reference set has a smaller number of reference blocks. Therefore, the storage speed, which partially depends on the deduplication speed, is greater than that of the global reference set. In some other implementations, when the goal of the storage process focuses on deduplication ratio, then the performance evaluation module 310 may run the local and the global reference sets and determine which one of them can provide better deduplication ratio. It should be recognized that because the global reference set manages information spreads across the storage devices and spreads across the data blocks arrival time, global reference set may achieve the better deduplication ratio.

Next, the method 1000 may advance by deduplicating 1010 each of the one or more data blocks of the data stream using the selected reference set. As depicted in FIG. 5, the process of deduplicating data blocks using the reference set may include the process of constructing the reference set. When there is similarity between the incoming data stream and the available reference set, the system 100 may encode the data blocks in the data stream based on the reference set. When there is no similarity between the incoming data stream and the available reference set, the system 100 may aggregate data blocks into a set of data blocks and generate new reference set using the set of data blocks. The operation described herein may be similar as the ones in steps 514-518 in FIG. 5.

Figure 11:
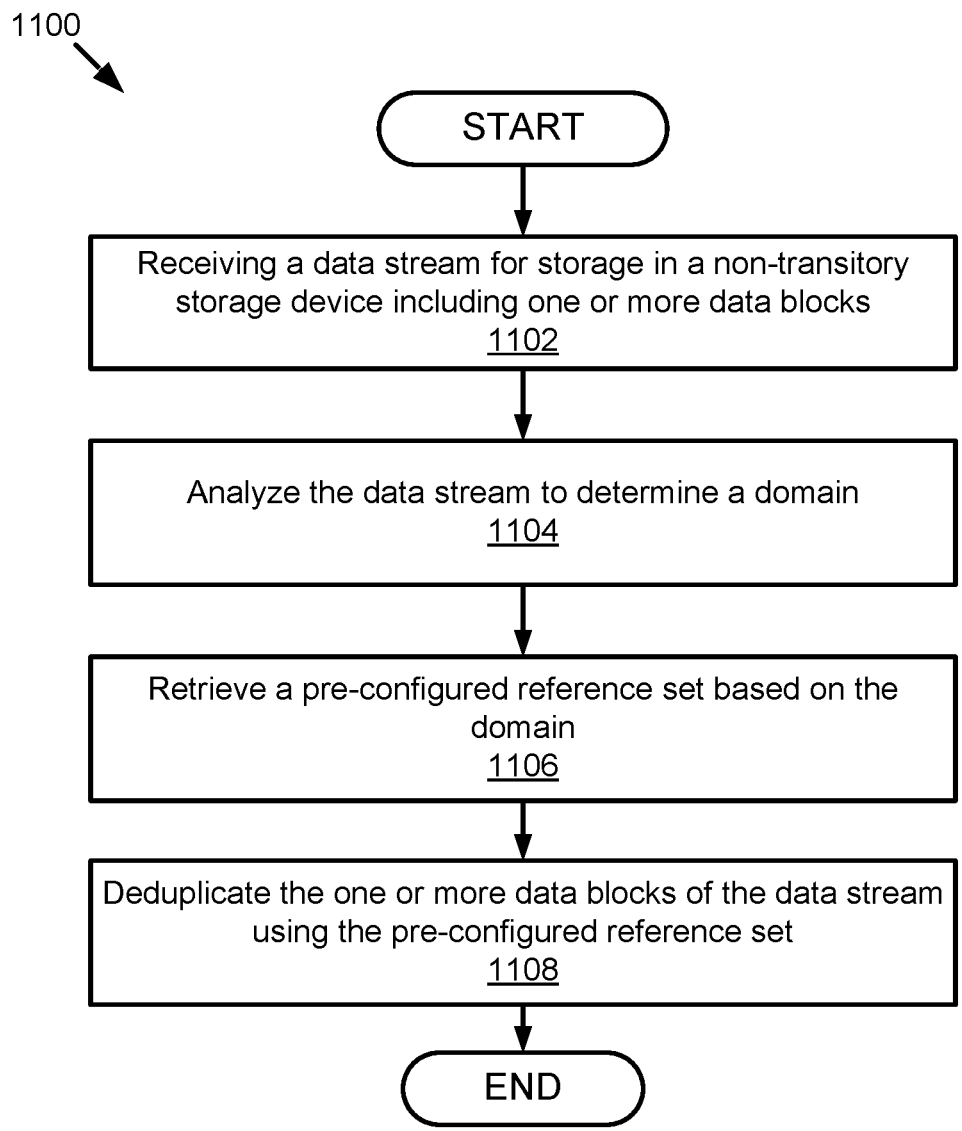
FIG. 11 is a flow chart of an example method for deduplicating data blocks using a domain reference set.

FIG. 11 is a flow chart of an example method 1100 for deduplicating data blocks using a domain reference set according to the techniques described herein. As discussed above, a domain reference set may be a reference set that is pre-configured prior to the data stream storage process. For instance, one particular example of domain reference set may be a reference set for financial data, which may be pre-configured ahead of time and is ready for use immediately. In this case, the system 100 does not need to create a reference set incrementally during the procedure of storing data stream.

The method 1100 may begin by receiving 1102 a data stream for storage in a non-transitory storage device including one or more data blocks. In some implementations, the command queue unit 202 may receive the data stream including one or more data blocks from one or more devices.

Next, the method 1100 may continue by analyzing 1104 the data stream to determine a domain. In some other implementations, the domain analysis may be a process that identifies the characteristics of the incoming data stream.

Next, the method 1100 may advance by retrieving 1106 a pre-configured reference set based on the domain. The operation performed in step 1106 may be performed by the command queue unit 202 in cooperation with one or more other components of the system 100.

The method 1100 may continue by deduplicating 1108 each of the one or more data blocks using the pre-configured domain reference set of the identified namespace. The operation performed in step 908 may be performed by compression unit 208 in cooperation with one or more other components of the system 100. As depicted in FIG. 5, the process of deduplicating data blocks using the reference set may include the process of constructing the reference set. When there is similarity between the incoming data stream and the available reference set, the system 100 may encode the data blocks in the data stream based on the reference set. When there is no similarity between the incoming data stream and the available reference set, the system 100 may aggregate data blocks into a set of data blocks and generate new reference set using the set of data blocks. The operation described herein may be similar as the ones in steps 514-518 in FIG. 5.

Figure 12:
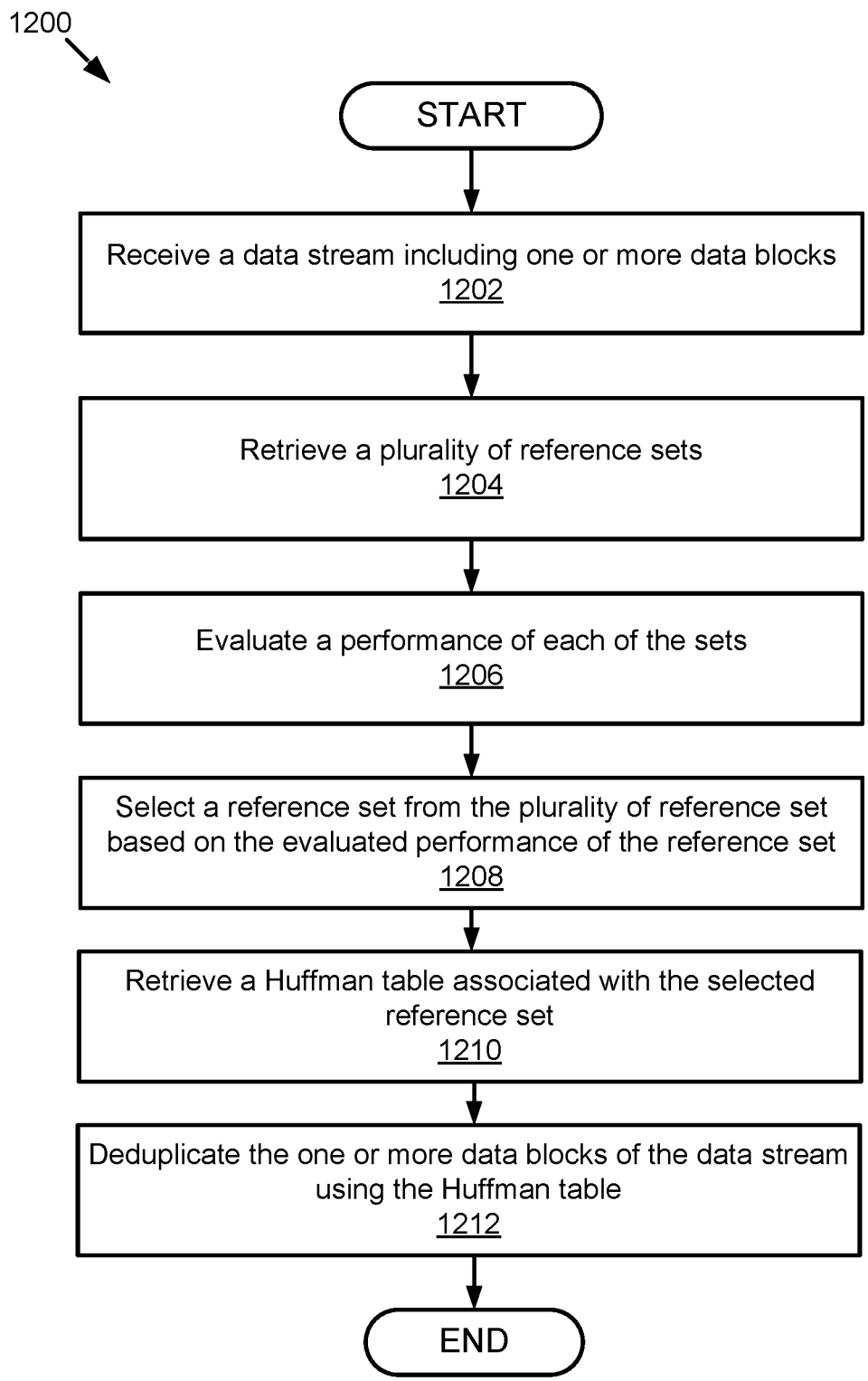
FIG. 12 is a flow chart of an example method for using a Huffman table associated with a reference set to compress a data stream.

FIG. 12 is a flow chart of an example method 1200 for using the Huffman table of the reference set to compress data stream based on the similarity between the data stream and the reference set according to the techniques described herein. As discussed above, Huffman table 224 may be used to compress data stream in the storage devices 110. The method 1200 may begin by receiving 1202 a data stream including one or more data blocks. In some implementations, the command queue 202 may receive the data stream including one or more data blocks from one or more devices.

Next, the method 1200 may proceed by retrieving 1204 a plurality of reference sets. In some implementations, the compression unit 208 may retrieve the plurality of reference sets 218. Next, the method 1200 may continue by evaluating 1206 a performance of each of the reference sets 218. In some implementations, the performance evaluation module 310 may evaluate the performance of the plurality of reference sets 218. As discussed above, the performance evaluation module 310 may use various criteria to determine the performance of different reference and select one for deduplicating the data stream.

Next, the method 1200 may continue by selecting 1208 a reference set from the plurality of reference set based on the evaluated performance of the reference set.

The method 1200 may continue by retrieving 1210 a Huffman table associated with the selected reference set. It should be recognized that the selected reference set is similar to the data blocks. The Huffman table for the selected reference set may be a good Huffman table to compress the data stream. This is because of the similarity between the selected reference set and the data blocks intended to be compressed.

Next, the method 1200 may continue by deduplicating 1212 the data stream using the Huffman table. It should be recognized that this Huffman table may provide better compression result than a static Huffman table due to the similarity feature between the data blocks and the reference set. It should also be recognized that this Huffman table may consume less computing resources than using one that is calculated afresh.

Systems and methods for constructing reference sets in a storage device are described below. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of online services; however, the disclosed technologies apply to other data sources and other data types (e.g., collections of other resources for example images, audio, web pages).

Reference in the specification to "one implementation," "some implementations" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage system, comprising:
   a non-transitory storage device storing data blocks in chunks;
   a processor coupled to the non-transitory storage device, the processor configured to:
   receive a data stream for storage in the non-transitory storage device, the data stream including one or more data blocks;
   analyze the data stream to determine a domain;
   retrieve a pre-configured reference set based on the domain, the pre-configured reference set defined by a group of data blocks; and
   deduplicate the one or more data blocks of the data stream using the pre-configured reference set by being further configured to:
   encode, responsive to the one or more blocks in the data stream and the group of data blocks in the reference set meeting a similarity criterion, the one or more blocks based on the reference set,
   aggregate, responsive to:
   (a) the one or more blocks in the data stream and the group of data blocks in the reference set not meeting the similarity criterion, and
   (b) the one or more blocks in the data stream having a threshold similarity to each other,
   the one or more blocks into an aggregated set of data blocks comprising data blocks different from the data blocks in the pre-configured reference set, and
   generate a new reference set using the set of data blocks.

2. The data storage system of claim 1, wherein the processor is further configured to:
   evaluate performance of the pre-configured reference set in deduplicating data blocks of one or more prior data streams;
   assign a performance score to the pre-configured reference set based on the evaluated performance; and
   generate a ranking for the pre-configured reference set for the domain relative to other reference sets associated with the domain based on the performance score, wherein retrieving the pre-configured reference set includes retrieving the pre-configured reference set based further on the ranking of the pre-configured reference set.

3. The data storage system of claim 2, wherein the performance of the pre-configured reference set is evaluated based on a deduplication ratio.

4. The data storage system of claim 2, wherein the performance of the pre-configured reference set is evaluated based on a deduplication speed.

5. The data storage system of claim 1, wherein the domain is a range of physical area of the non-transitory storage device that hosts data blocks with similar characteristics.

6. The data storage system of claim 1, wherein the processor is further configured to:
   generate the pre-configured reference set as a synthetic reference set for data block sequences that repeat at a rate above a predetermined threshold;
   identify a duplicated data block sequence;
   retrieve the synthetic reference set based on the duplicated data block sequence; and
   deduplicate the identified duplicated data block sequence using the synthetic reference set.

7. The data storage system of claim 1, wherein the processor is further configured to:
   assign a use count variable to the pre-configured reference set;
   update the use count variable when the pre-configured reference set is used to deduplicate the data blocks; and
   store the pre-configured reference set including the use count variable in the non-transitory storage device.

8. A method comprising:
   receiving a data stream for storage in a non-transitory storage device, the data stream including one or more data blocks;
   analyzing the data stream to determine a domain;

retrieving a pre-configured reference set based on the domain, the pre-configured reference set defined by a group of data blocks; and deduplicating the one or more data blocks of the data stream using the pre-configured reference set, the deduplicating comprising:

encoding, responsive to the one or more blocks in the data stream and the group of data blocks in the reference set meeting a similarity criterion, the one or more blocks based on the reference set, aggregating, responsive to:
  (a) the one or more blocks in the data stream and the group of data blocks in the reference set not meeting the similarity criterion, and
  (b) the one or more blocks in the data stream having a threshold similarity to each other,
  the one or more blocks into an aggregated set of data blocks comprising data blocks different from the data blocks in the pre-configured reference set; and generating a new reference set using the aggregated set of data blocks.

9. The method of claim 8, further comprising:
evaluating performance of the pre-configured reference set in deduplicating data blocks of one or more prior data streams;
assigning a performance score to the pre-configured reference set based on the evaluated performance; and
generating a ranking for the pre-configured reference set for the domain relative to other reference sets associated with the domain based on the performance score, wherein retrieving the pre-configured reference set includes retrieving the pre-configured reference set based further on the ranking of the pre-configured reference set.

10. The method of claim 9, wherein the performance of the pre-configured reference set is evaluated based on a deduplication ratio.

11. The method of claim 9, wherein the performance of the pre-configured reference set is evaluated based on a deduplication speed.

12. The method of claim 8, wherein the domain is a range of physical area of the non-transitory storage device that hosts data blocks with similar characteristics.

13. The method of claim 8, further comprising:
generating the pre-configured reference set as a synthetic reference set for data block sequences that repeat at a rate above a predetermined threshold;
identifying a duplicated data block sequence;
retrieving the synthetic reference set based on the duplicated data block sequence; and
deduplicating the identified duplicated data block sequence using the synthetic reference set.

14. The method of claim 8, further comprising:
assigning a use count variable to the pre-configured reference set;
updating the use count variable when the pre-configured reference set is used to deduplicate the data blocks; and storing the pre-configured reference set including the use count variable in the non-transitory storage device.

15. A data storage system comprising:
means for receiving a data stream for storage in a non-transitory storage device, the data stream including one or more data blocks;
means for analyzing the data stream to determine a domain;
means for retrieving a pre-configured reference set based on the domain, the pre-configured reference set defined by a group of data blocks; and
means for deduplicating the one or more data blocks of the data stream using the pre-configured reference set, the means for deduplicating comprising:
  means for encoding, responsive to the one or more blocks in the data stream and the group of data blocks in the reference set meeting a similarity criterion, the one or more blocks based on the reference set,
  means for aggregating, responsive to:
    (a) the one or more blocks in the data stream and the group of data blocks in the reference set not meeting the similarity criterion, and
    (b) the one or more blocks in the data stream having a threshold similarity to each other,
    the one or more blocks into an aggregated set of data blocks comprising data blocks different from the data blocks in the pre-configured reference set, and
  means for generating a new reference set using the set of data blocks.

16. The data storage system of claim 15, further comprising:
means for evaluating performance of the pre-configured reference set in deduplicating data blocks of one or more prior data streams;
means for assigning a performance score to the pre-configured reference set based on the evaluated performance; and
means for generating a ranking for the pre-configured reference set for the domain relative to other reference sets associated with the domain based on the performance score, wherein retrieving the pre-configured reference set includes retrieving the pre-configured reference set based further on the ranking of the pre-configured reference set.

17. The data storage system of claim 16, wherein the performance of the pre-configured reference set is evaluated based on a deduplication ratio.

18. The data storage system of claim 16, wherein the performance of the pre-configured reference set is evaluated based on a deduplication speed.

19. The data storage system of claim 15, wherein the domain is a range of physical area of the non-transitory storage device that hosts data blocks with similar characteristics.

* * * * *